United States Patent [19]
Terada et al.

[11] Patent Number: 5,573,703
[45] Date of Patent: Nov. 12, 1996

[54] FERROELECTRIC LIQUID CRYSTAL DEVICE AND LIQUID CRYSTAL APPARATUS USING IT

[75] Inventors: Masahiro Terada, Atsugi; Shosei Mori, Hiratsuka; Masataka Yamashita, Chigasaki, all of Japan

[73] Assignee: Canon Kabushiki Kaisha, Tokyo, Japan

[21] Appl. No.: 320,525

[22] Filed: Oct. 11, 1994

[30] Foreign Application Priority Data

Oct. 13, 1993 [JP] Japan .................................. 5-280436
Sep. 22, 1994 [JP] Japan .................................. 6-254379

[51] Int. Cl.$^6$ .................... C09K 19/52; C09K 19/34; C09K 19/20; G02F 1/15
[52] U.S. Cl. ............... 252/299.01; 359/104; 252/299.61; 252/299.67
[58] Field of Search ................... 252/299.61, 299.62, 252/299.01, 299.4, 299.61, 299.62; 359/104.75

[56] References Cited

U.S. PATENT DOCUMENTS

| | | | |
|---|---|---|---|
| 4,367,924 | 1/1983 | Clark et al. | 359/56 X |
| 4,820,026 | 4/1989 | Okada et al. | 359/51 |
| 4,917,821 | 4/1990 | Mori et al. | 252/299.63 |
| 5,076,961 | 12/1991 | Nakamura et al. | 252/299.61 |
| 5,091,109 | 2/1992 | Takiguchi et al. | 252/299.61 |
| 5,118,441 | 6/1992 | Mori et al. | 252/299.61 |

(List continued on next page.)

FOREIGN PATENT DOCUMENTS

| | | |
|---|---|---|
| 59-193426 | 11/1984 | Japan . |
| 59-193427 | 11/1984 | Japan . |
| 60-031120 | 2/1985 | Japan . |
| 60-156046 | 8/1985 | Japan . |
| 60-156047 | 8/1985 | Japan . |
| 01140198 | 6/1989 | Japan . |
| 03252624 | 11/1991 | Japan . |

OTHER PUBLICATIONS

Yukio Ouchi et al., Smectic C* Chevron Layer Structure Studied by X–Ray Diffraction, May, 1988, pp. L725–L728, Japanese J. Appl. Phys., vol. 27, No. 5.
Fumio Nakano et al., Simple Method of Determining Liquid Crystal Tilt–Bias Angle, 1980, p. 2013, Japanese J. Appl. Phys., vol. 19, No. 10.
N. A. Clark and S. T. Lagerwall, Structures and Applications of SSFLC Devices, Sep. 30–Oct. 2, 1986, pp. 456–458. Proceedings of the 6th International Display Research Conference.

*Primary Examiner*—C. H. Kelly
*Attorney, Agent, or Firm*—Fitzpatrick, Cella, Harper & Scinto

[57] ABSTRACT

A ferroelectric liquid crystal device comprises:

a pair of substrates comprising electrodes for applying a voltage, the pair of substrates having been subjected to a uniaxial orientation treatment, and being oriented at a distance opposite to each other such that the uniaxial orientation axes cross each other at a predetermined angle; the display device further comprising a liquid crystal material disposed between the exhibiting at least two stable states and pair of substrates, the liquid crystal material having a cone angle, a pretilt angle, a tilt angle and an apparent tilt angle, wherein:

the liquid crystal material having an orientation state which satisfies the conditions represented by $$\Theta < \alpha + \delta, \delta < \alpha, \text{ and } \Theta > \Theta_\alpha > \Theta/2$$

in which $\Theta$ denotes the cone angle, $\alpha$ denotes the pretilt angle, $\delta$ denotes the tilt angle and $\Theta_\alpha$ denotes the apparent tilt angle, wherein the phase of the liquid crystal changes from isotropic phase via cholesteric phase and smectic A phase to chiral smectic C phase as the liquid crystal cools from a high temperature and the liquid crystal has a temperature range in which the cholesteric phase and the smectic A phase exist at the same time.

18 Claims, 10 Drawing Sheets

U.S. PATENT DOCUMENTS

| | | | |
|---|---|---|---|
| 5,139,697 | 8/1992 | Togano et al. | 252/299.61 |
| 5,143,643 | 9/1992 | Iwaki et al. | 252/299.61 |
| 5,165,076 | 11/1992 | Tsuboyama et al. | 359/75 |
| 5,190,690 | 3/1993 | Takiguchi et al. | 252/299.61 |
| 5,200,109 | 4/1993 | Iwaki et al. | 252/299.61 |
| 5,250,219 | 10/1993 | Mori et al. | 252/299.61 |
| 5,250,221 | 10/1993 | Yamashita et al. | 252/299.63 |
| 5,269,964 | 12/1993 | Yamashita et al. | 252/299.61 |
| 5,305,131 | 4/1994 | Terada et al. | 359/104 |
| 5,311,343 | 5/1994 | Katagiri et al. | 359/90 |
| 5,417,883 | 5/1995 | Epstein et al. | 252/299.01 |
| 5,422,748 | 6/1995 | Yamashita et al. | 359/75 |

C1 ORIENTATION   $\Theta + \delta > \alpha$

C2 ORIENTATION   $\Theta - \delta > \alpha$

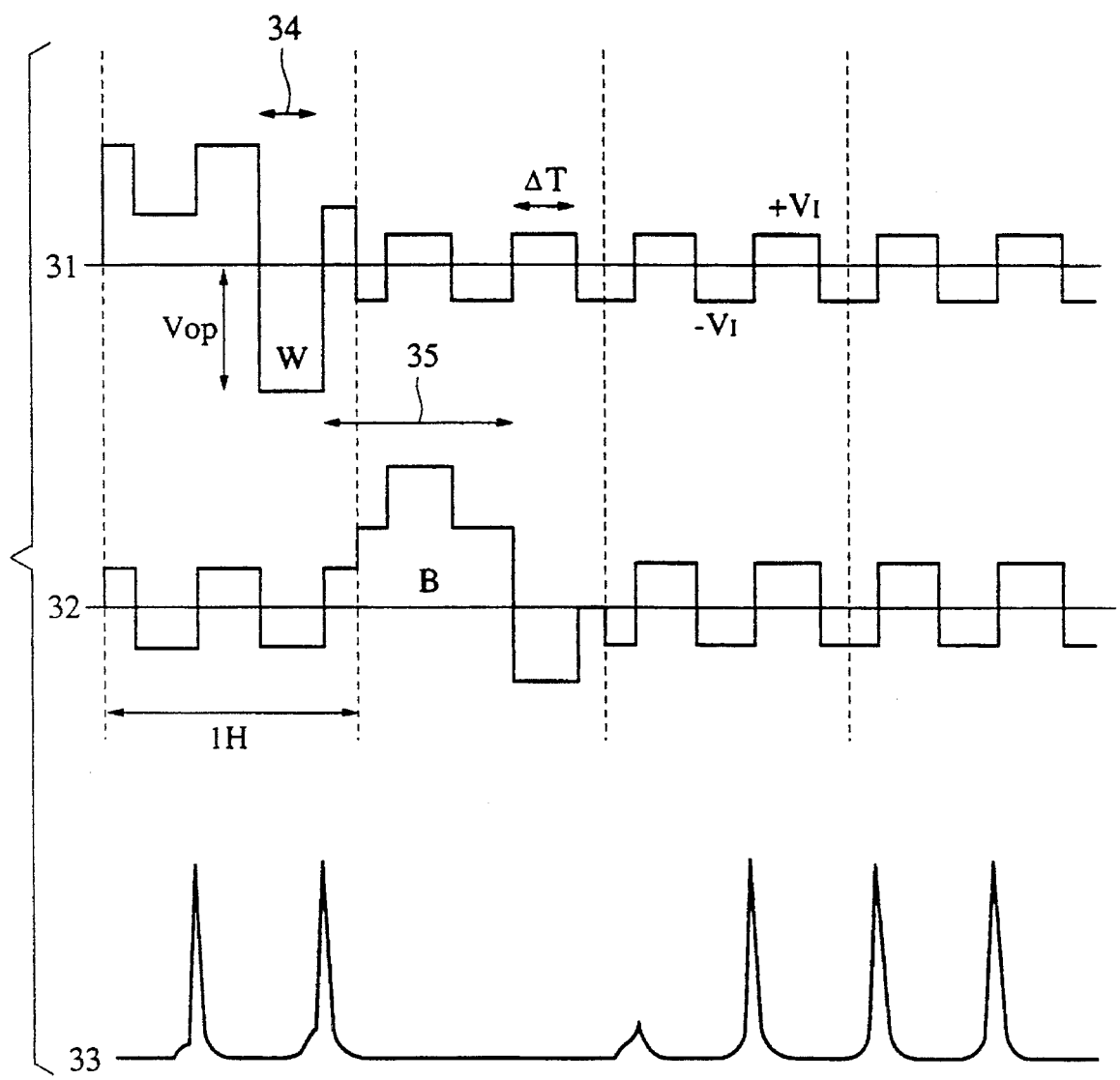

UNIAXIAL ORIENTATION AXIS DIRECTION

UNIAXIAL ORIENTATION AXIS DIRECTION

FERROELECTRIC LIQUID CRYSTAL DEVICE AND LIQUID CRYSTAL APPARATUS USING IT

BACKGROUND OF THE INVENTION

1. Field of the Invention

The present invention relates to a ferroelectric liquid crystal ("FLC") device and a liquid crystal apparatus containing the same. More specifically, the present invention relates to a FLC device structure which prevents a reduction in contrast due to fluctuations of liquid crystal molecules.

2. Description of the Related Art

Clark and Lagerwall have proposed a display device in which the property of anisotropic refractive index of the ferroelectric liquid crystal is advantageously used with a polarizing element to control light transmission (U.S. Pat. No. 4,367,924). In general, ferroelectric liquid crystals have a non-helical structure in a chiral smectic C phase (SmC*) or H phase (SmH*) in a specific temperature range. Such a ferroelectric liquid crystal can be in either a first stable optical state or second stable optical state depending on an applied electric field, which will be maintained even if the applied electric field is removed. This property is called "bistability". Furthermore, ferroelectric liquid crystals can respond quickly to a change in the electric field. Therefore, ferroelectric liquid crystals are expected to be used in a variety of high-speed and/or storage-type display devices. Their properties especially allow them to be used in high-resolution and large-size display devices. Japanese Laid-Open Patent No. 03-252624, discloses a technique to achieve high contrast and high-speed operation in a large-size high-resolution display using a chiral smectic ferroelectric liquid crystal.

First, methods of achieving high contrast will be discussed. In general, the transmittance ($I/I_0$) of a liquid crystal using the property of birefringence under the crossed-Nicol condition is given by $$I/I_0 = \sin 4\theta_a \sin^2 (\Delta n \, d/\lambda)\pi$$

where $I_0$ is the intensity of incident light, $I_0$ is the intensity of transmitted light, $\theta_a$ is an apparent tilt angle, $\Delta n$ is anisotropy in refractive index, d is the thickness of a liquid crystal layer, and $\lambda$ is the wavelength of incident light. It can be seen from the above equation that it is preferable to employ 22.5° as the apparent tilt angle $\theta_a$ (described later in detail) to obtain a high transmittance, thereby achieving improved display quality.

In the case of a liquid crystal oriented in a non-helical structure as described above and as utilized herein, the "apparent tilt angle" $\theta_a$ is given by an angle between the average molecular axis of liquid crystal molecules in the first orientation state and the average molecular axis of liquid crystal molecules in the second orientation state.

However, in a conventional ferroelectric liquid crystal device having a non-helical orientation structure formed by orienting the liquid crystal using a rubbing-treated tilt angle $\theta_a$ (one-half the angle between molecular axes of polyimide film as an orientation control layer, the apparent molecules in two stable states) becomes smaller than the cone angle of the ferroelectric liquid crystal (represented by $\Theta$ in FIG. 2A and B, which is half the vertical angle of a triangular pyramid shown). Typically, the apparent tilt angle is thus in the range from 3° to 8°, and thus the transmittance $I/I_0$ is as low as 3% to 5%.

In general, smectic liquid crystals have a layer structure, and the distance between layers shrinks during the transition from the SmA phase to the SmC phase or SmC* phase. Thus, liquid crystal layers denoted by 11 in FIG. 1 are bent at the center between upper and lower substrates. Liquid crystal layers can bend in two different directions. In an orientation state (C1 orientation state) which occurs just after the transition from a high-temperature phase to an SmC* phase, liquid crystals are oriented in the manner shown in region 12 in FIG. 1. If temperature is lowered further, liquid crystals assume another orientation state (C2 orientation state) which appears in mixture with the C1 orientation state, in which liquid crystals are oriented in the manner shown in region 13 in FIG. 1. It is known that C1-oriented liquid crystals can be in two stable low contrast states (hereafter referred to as "splay" states) in which directors of liquid crystals are twisted between upper and lower substrates. In addition to the splay states, the present inventors have also determined that there are two high contrast stable states (hereafter referred to as "uniform" states).

If an electric field is applied, transition occurs between these states. When small amplitude positive and negative electric field pulses are applied, transition occurs between two splay states. On the other hand, if large amplitude positive and negative electric field pulses are applied, transition occurs between two uniform states.

In the uniform states, the apparent tilt angle $\theta_a$ becomes large. Accordingly, it is possible to realize liquid crystal display devices which exhibit higher brightness and higher contrast than conventional devices. Therefore, use of a liquid crystal is in the C1 orientation state over the entire display area of a display device, and use of two high-contrast states in the C1 orientation for displaying white and black, provides a display device with higher performance than conventional display devices.

In regions near substrates, directors in C1 and C2 orientations are on cones 21 in FIGS. 2(A) and 2(B), respectively. As is well known, if rubbing is carried out, liquid crystal molecules lying at substrate interfaces achieve a pretilt angle in such directions that head portions of liquid crystal molecules rise relative to the rubbing direction (shown by A in FIGS. 2(A) and 2(B)). That is, end portions of liquid crystal molecules float relative to the rubbing direction.

From the above, the following relationship holds among the cone angle $\Theta$, pretilt angle $\alpha$, and layer tilt angle $\delta$ (the angle between a liquid layer and the normal of a substrate);

$\Theta + \delta < \alpha$ for C1 orientation;

$\Theta - \delta > \alpha$ for C2 orientation.

Therefore, if the following condition holds, it is possible to obtain the C1 orientation without C2 orientation;

$$\Theta - \delta < \alpha \text{ or } \Theta < \alpha + \delta \tag{I}$$

Furthermore, by simple considering the torque exerted by an applied electric field on liquid crystal molecules lying at an interface between a substrate and a liquid crystal layer, it is understood that liquid crystal molecules can be moved from one location to another if the following relationship holds.

$$\alpha > \delta \tag{II}$$

Thus, it can also be understood that if equations (I) and (II) are both satisfied, it becomes possible to achieve more stable formation of the C1 orientation state without transition from C1 to C2. Experiments have revealed that when both equations (I) and (II) are satisfied, the apparent tilt angle $\theta_a$ increases from 3°–8° to about 8°–16°, and furthermore the following relationship holds between the cone angle $\Theta$ and tilt angle $\theta_a$ of a liquid crystal:

$$\Theta > \theta_a > \Theta/2 \qquad (\text{III})$$

As described above, it has become clear that if equations (I), (II), and (III) are satisfied in a ferroelectric liquid crystal device, then it is possible to realize a high-quality display device which provides high-contrast images.

Next, methods of achieving high-speed operation in a liquid crystal display will be discussed.

If a chiral smectic liquid crystal device is used, it is possible to realize a display having much higher resolution and having a much larger display area than conventional displays such as cathode ray tubes ("CRTs"), twisted nematic ("TN") type liquid crystal displays, etc. However, as the display area becomes larger and the resolution becomes higher, the frame frequency (the period required to form one picture) becomes lower. This means that there is a problem that operation speeds become too low for image rewriting, character editing, smooth scrolling of graphics images, cursor movement, etc.

One technique to solve this problem is disclosed in Japanese Laid-Open Patent Applications Nos. 60-31120 and 1-140198. In this technique, a display is constructed with: a display panel having scanning electrodes and information electrodes arranged in a matrix; means for selecting all or a predetermined number of scanning electrodes (referred to as "entire-area" writing); and means for selecting fewer than all or the predetermined number of scanning electrodes (referred to as "partial" writing); whereby moving portions of an image are displayed at a high speed by partial writing while maintaining capability of entire writing. Taking the above into account, if a liquid crystal device satisfying the conditions (I), (II), and (III) is driven in partial-writing, it is possible to achieve high-speed display a high-contrast image in a high-resolution large-size display device. However, if such a liquid crystal device is driven by an applied voltage in the above-described manner, fluctuation occurs in liquid crystal molecules due to pulses applied to the liquid crystal device during non-selected time periods. These pulse fluctuations result in a great reduction in contrast and thus great degradation in display quality. In fact, in extreme cases, movement of the liquid crystal material occurs and the device is destroyed.

In a conventional display panel using a chiral smectic liquid crystal, scanning and information electrodes are arranged in a matrix form between upper and lower substrates so that a predetermined voltage is applied to the liquid crystal. FIG. 3 illustrates an example of an applied voltage waveform, in which the waveform 31 is used to display white, and the waveform 32 is used to display black.

In waveforms 31 and 32, electric fields required to display white and black at each matrix point (the intersection points between the scanning and information electrodes) are found in periods 34 and 35, respectively. During the other periods (non-selected periods), positive and negative electric fields having such small magnitudes that no rewriting occurs are alternately applied. Of course, the total time of non-selected periods is much longer than the selected periods during which an electric field is applied to an element at matrix point.

Since positive and negative electric fields too small to invert liquid crystal molecules are applied alternately even during the non-selected periods, at the moment an electric field is applied to liquid crystal molecules having a polarity opposite to the spontaneous polarization of such molecules in one stable, they are subjected to force which tries to invert the liquid crystal molecules into the other stable state. In some cases, as a result, these liquid crystal molecules move by a small amount on cone 21 shown in FIG. 2(a) or 2(b) in the inversion direction. At the moment immediately thereafter, the liquid crystal molecules return to the first stable state by an applied field having an opposite polarity. In this way, liquid crystal molecules are inverted repeatedly, causing "fluctuations" of liquid crystal molecules. These fluctuations can produce a defect through which light can pass when the point should display black. As a result, contrast is reduced and degradation in display quality occurs.

SUMMARY OF THE INVENTION

In view of the above, it is an object of the present invention to provide a ferroelectric liquid crystal device in which fluctuations of liquid crystal molecules due to pulses applied during non-selected periods is minimized, and a reduction in contrast during dynamic periods and damage due to movement of liquid crystal molecules are prevented.

It is another object of the present invention to provide a liquid crystal apparatus having a liquid crystal display exhibiting excellent display performance.

To achieve the above objects, the present invention provides a liquid crystal device including:

a pair of substrates comprising electrodes for applying a voltage, said pair of substrates having been subjected to a uniaxial orientation treatment, and being oriented at a distance opposite to each other such that the uniaxial orientation axes cross each other at a predetermined angle; said display device further comprising a liquid crystal material disposed between said exhibiting at least two stable states and pair of substrates, said liquid crystal material having a cone angle, a pretilt angle, a tilt angle and an apparent tilt angle, wherein:

said liquid crystal material having an orientation state which satisfies the conditions represented by $$\Theta < \alpha + \delta, \delta < \alpha, \text{ and } \Theta > \Theta_a > \Theta/2$$

in which $\Theta$ denotes said cone angle, $\alpha$ denotes said pretilt angle, $\Theta$ denotes said tilt angle and $\alpha_a$ denotes said apparent tilt angle.

wherein the phase of said liquid crystal changes from isotropic phase via cholesteric phase and smectic A phase to chiral smectic C phase as said liquid crystal cools from a high temperature and said liquid crystal has a temperature range in which said cholesteric phase and said smectic A phase exist at the same time.

To achieve another object of the present invention, the present invention provides a liquid crystal apparatus having the ferroelectric liquid crystal device constructed in such a manner as described above.

Furthermore, the present invention provides a liquid crystal device, that is, a liquid crystal apparatus including the above-described liquid crystal device, a driving unit for driving the liquid crystal, and a light source for illuminating the liquid crystal device.

In the ferroelectric liquid crystal device according to the present invention, there is a temperature range in which both cholesteric phase and smectic A phase exist at the same time, which allows control of the liquid crystal orientation state such as the ratio of the straight line defect density and the wavy line defect density of a liquid crystal layer.

In the liquid crystal device according to the present invention, the apparent tilt angle has a large value and thus high display quality such as high contrast can be obtained. Besides, fluctuations of liquid crystal molecules are suppressed and therefore degradation in display quality and destruction of the device due to the movement of the liquid crystal are prevented.

Furthermore, in the liquid crystal apparatus according to the present invention, the above-described high performance of the ferroelectric liquid crystal device provides excellent performance such as high display quality.

BRIEF DESCRIPTION OF THE DRAWINGS

FIG. 3 is a timing chart illustrating waveforms of an applied electric field, optical response and driving voltage;

DESCRIPTION OF THE PREFERRED EMBODIMENTS

The construction of the ferroelectric liquid crystal device according to the present invention, including the liquid crystal orientation state and the phase transition of the liquid crystal layer, is determined to achieve desired device characteristics. Among the various parameters and factors that must be selected are included liquid crystal materials, the orientation treatment of the orientation control films, the crossing angle between orientation axes of upper and lower substrates, the deposition condition of films, and the gap between the substrates.

An example of the structure of a ferroelectric liquid crystal device according to the present invention will now be described in more detail, referring to FIG. 4.

Figure 4:
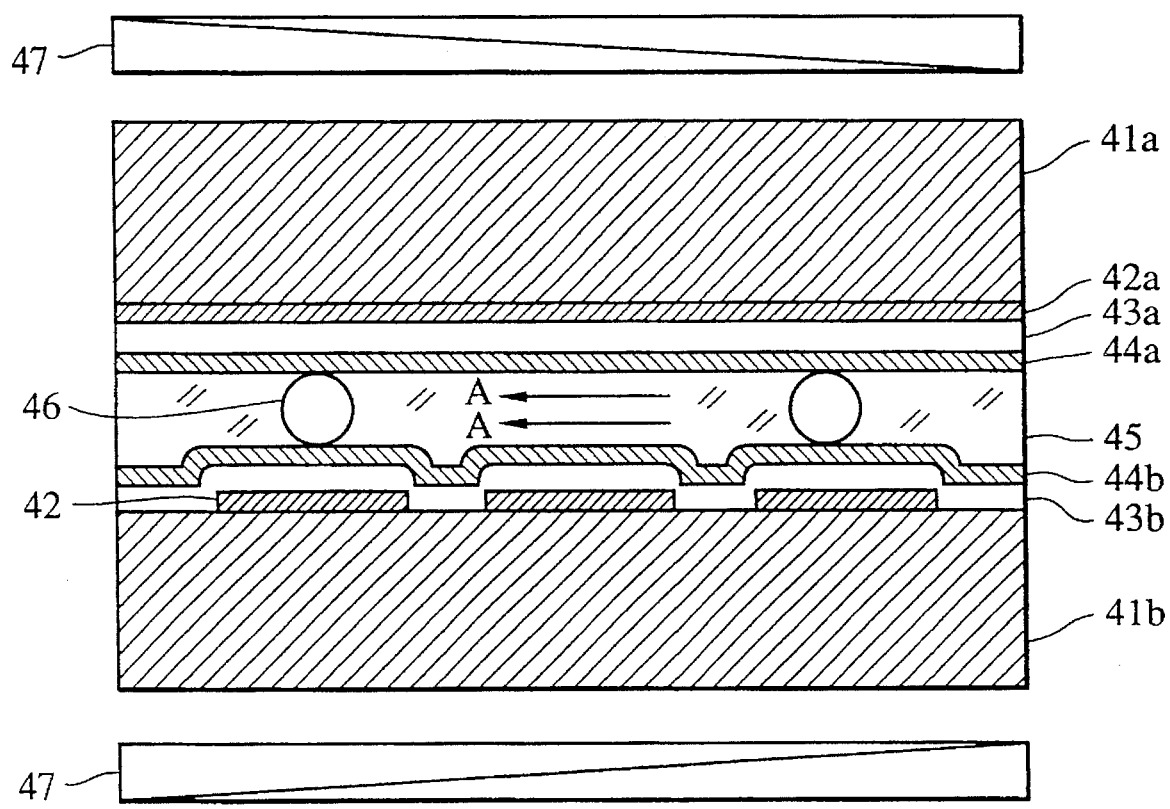
FIG. 4 is a cross-section of a ferroelectric liquid crystal device according to the present invention.

The liquid crystal device shown in FIG. 4 has two glass substrates 41a and 41b. Transparent electrodes 42a and 42b are formed on the glass substrates 41a and 41b, respectively. These transparent electrodes 42a and 42b are formed with a thin film such as $In_2O_3 \cdot SnO_2$ or indium tin oxide ("ITO"), and are covered with insulating films 43a, 43b and orientation control films 44a and 44b, respectively. The insulating films 43a and 43b are typically at least one inorganic material such as silicon nitride, silicon carbide containing hydrogen, silicon oxide, boron nitride, boron nitride containing hydrogen, cerium oxide, aluminum oxide, zirconium oxide, titanium oxide, magnesium fluoride, etc. The orientation control films 44a and 44b are typically at least one organic insulating material such as polyvinyl alcohol, polyimide, polyamide-imide, polyester-imide, poly-para-xylene, polyester, polycarbonate, polyvinyl acetal, polyvinyl chloride, polyvinyl acetate, polyamide, polystyrene, cellulosic resin, melamine resin, urea resin, acrylate resin, photoresist resin, etc.

Insulating film 43a may be of a different material than insulating film 43b. Similarly, orientation control film 44a may be of a different material than orientation control film 44b. Furthermore, the present invention is not limited to the two-layer structure comprising insulating films 43a, 43b and orientation control films 44a, 44b since monolayer structures including only an inorganic or organic insulating orientation control layer may also be used. Whether the orientation control films 44a and 44b have a two-layer or monolayer structure, they are subjected to an orientation treatment using gauze or acetate fiber cloth.

The insulating films 43a and 43b and orientation control films 44a and 44b can be made by vacuum evaporation of inorganic materials. On the other hand, organic films can be made by coating a solution of organic insulating materials or a precursor solution (0.1 wt % to 20 wt %, more preferably 0.2 wt % to 10 wt % materials dissolved in a solvent) using a spin coating technique, dip coating technique, screen printing technique, splay coating technique, roller coating technique, or the like, and then cured under proper curing conditions (for example, under heat).

Thicknesses of insulating films 43a, 43b, and orientation control films 44a, 44b are usually in the range of 30 Å to 1 μm, more preferably 40 Å to 3000 Å, or the most preferably 40 Å to 1000 Å. The orientation treatment and arrangement of the insulating orientation films or orientation control films are factors which determine the construction of the device of the present invention, especially the orientation state of liquid crystal molecules. Accordingly, the factors are determined taking into account the gap between the substrates, the liquid crystal materials, and required device characteristics.

Figure 1:
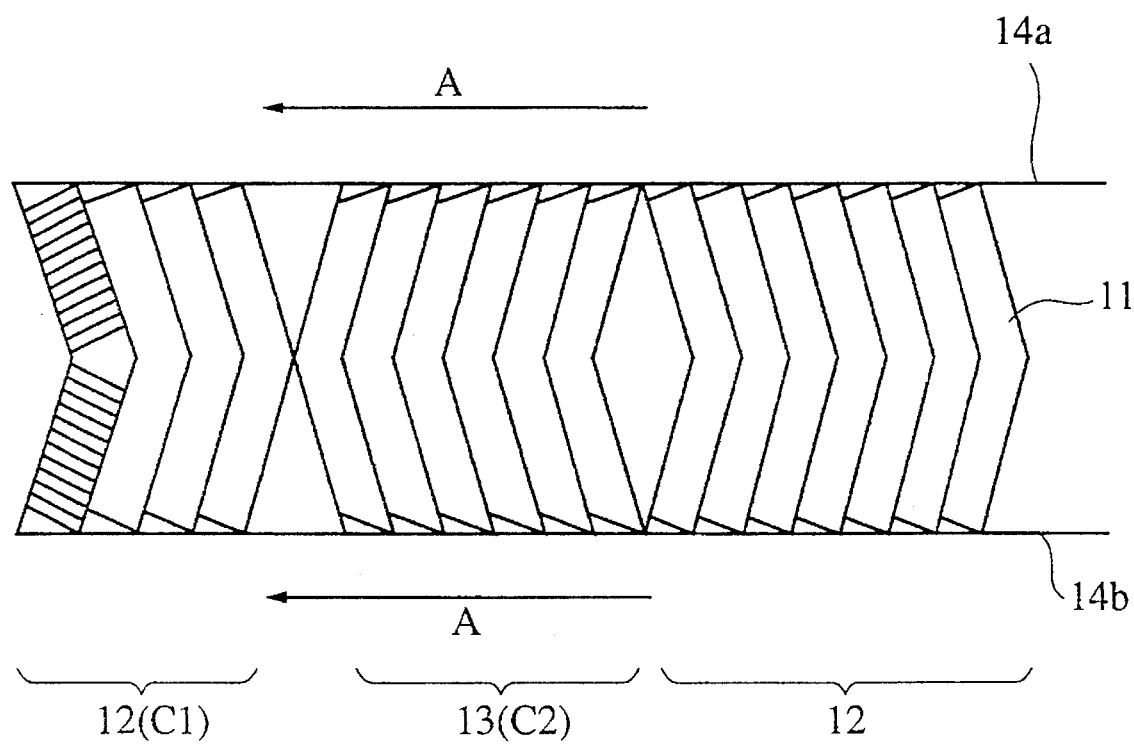
FIG. 1 is a top view of C1 and C2 orientation states.
Figure 2A:
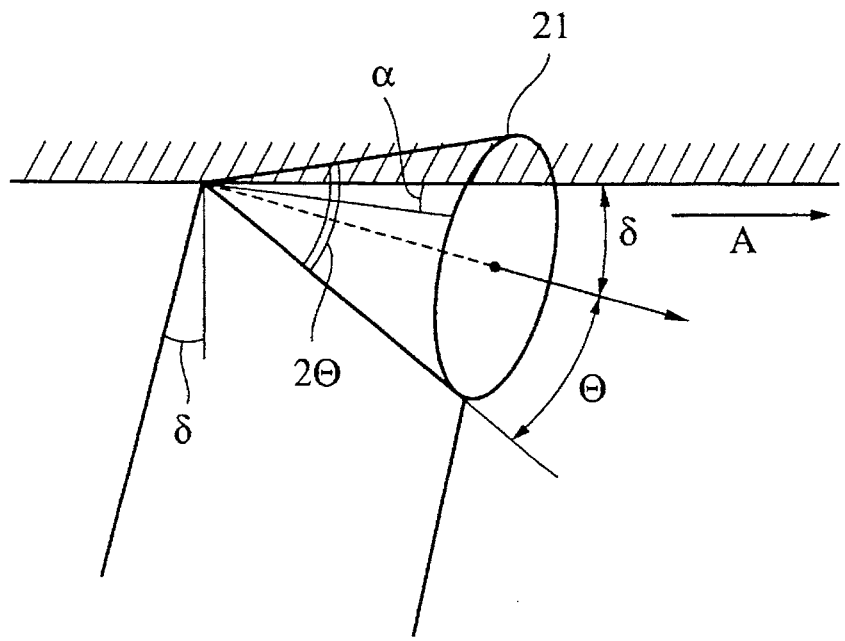
FIGS. 2(A) and 2(B) illustrate the cone, pretilt, and layer tilt angles, in C1 and C2 orientations, respectively.
Figure 2B:
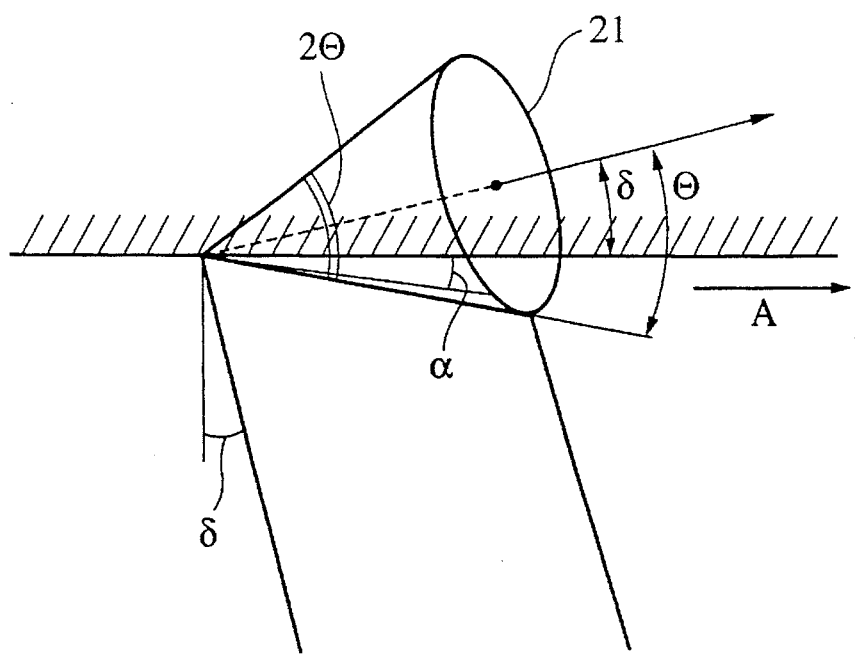

A spacer 46 is disposed between the above-described two glass substrates 41a and 41b so that the glass substrates 41a and 41b are located apart from each other by a predetermined distance (generally 0.1 to 20 μm, more preferably 0.5 to 3 μm). A silica or alumina bead, a macromolecular film, a glass fiber, and the like can be used as the spacer 46. Peripheral portions of the glass substrates 41a and 41b are sealed with a suitable sealing material such as an epoxy resin (not shown). A chiral smectic liquid crystal 45 having ferroelectric property is enclosed between glass substrates 41a and 41b. It is desirable that the liquid crystal 45 have SmC* phase (chiral smectic C phase) in a wide temperature range (especially in a low temperature range) including room temperature. It is also desirable that the liquid crystal 45 provide both wide driving voltage and driving temperature margins when used in a display device. Furthermore, it is especially desirable that the ferroelectric liquid crystal have a phase transition series of isotropic phase—Ch phase (cholesteric phase)—SmA (smectic phase)—SmC* (chiral smectic phase) to obtain good uniform orientation and a monodomain state. The above-described liquid crystal material is another factor which determines the construction of the device of the present invention, and thus it is properly selected taking into account various factors such as the deposition and orientation treatment conditions of the orientation control films and the gap between the substrates, etc. Polarizing plates 47a and 47b are bonded to the outer faces of the substrates 41a and 41b. The orientation control films 44a and 44b are subjected to rubbing treatment such that uniaxial orientation treatment is performed on the orientation film 44a with a crossing angle of about ±25°, preferably ±20° in the counter-clockwise direction as seen from the upper orientation film 44a (taking orientation film 44b as the reference of orientation), wherein both orientation films 44a and 44b are subjected to rubbing treatment in the same direction (denoted by arrows A in FIG. 1). As used herein, the term "crossing angle" of a liquid crystal device is defined as described above. In the liquid crystal device of the present invention, the crossing angle preferably has a value in the range of 0° to 25° to obtain a stable C1 orientation state or excellent orientation property. In the ferroelectric liquid crystal device having the above-described device structure according to the present invention, the liquid crystal material (i) has an orientation state which satisfies the conditions represented by $$\Theta < \alpha + \delta,$$

and $$\delta < \alpha,$$

in which $\Theta$ denotes the cone angle of the chiral smectic liquid crystal, $\alpha$ denotes the pretilt angle of the chiral smectic liquid crystal, and $\delta$ denotes the tilt angle of the chiral smectic liquid crystal; furthermore the liquid least two stable states, wherein the apparent tilt angle $\theta_a$ crystal in the above-described orientation state exhibits at (ii) has the following relationship with the cone angle $\Theta$ of the chiral smectic liquid crystal $$\Theta > \theta_a > \Theta/2,$$

the phase of the chiral smectic liquid crystal (iii) changes from isotropic liquid phase via cholesteric phase and smectic A phase to chiral smectic C phase as the chiral smectic liquid crystal is cooled down from a high temperature, and (iv) has a temperature range in which both cholesteric and smectic A phases exist together.

Preferably, the temperature range in which both cholesteric and smectic A phases exist at the same time is greater than 0.3° C., and more preferably greater than 0.7° C.

Since the ferroelectric liquid crystal device according to the present invention has excellent characteristics, it can be used in a variety of liquid crystal apparatus. The FLC device is especially suitable for use as a display element in a display panel of a liquid crystal display apparatus.

Figure 5:
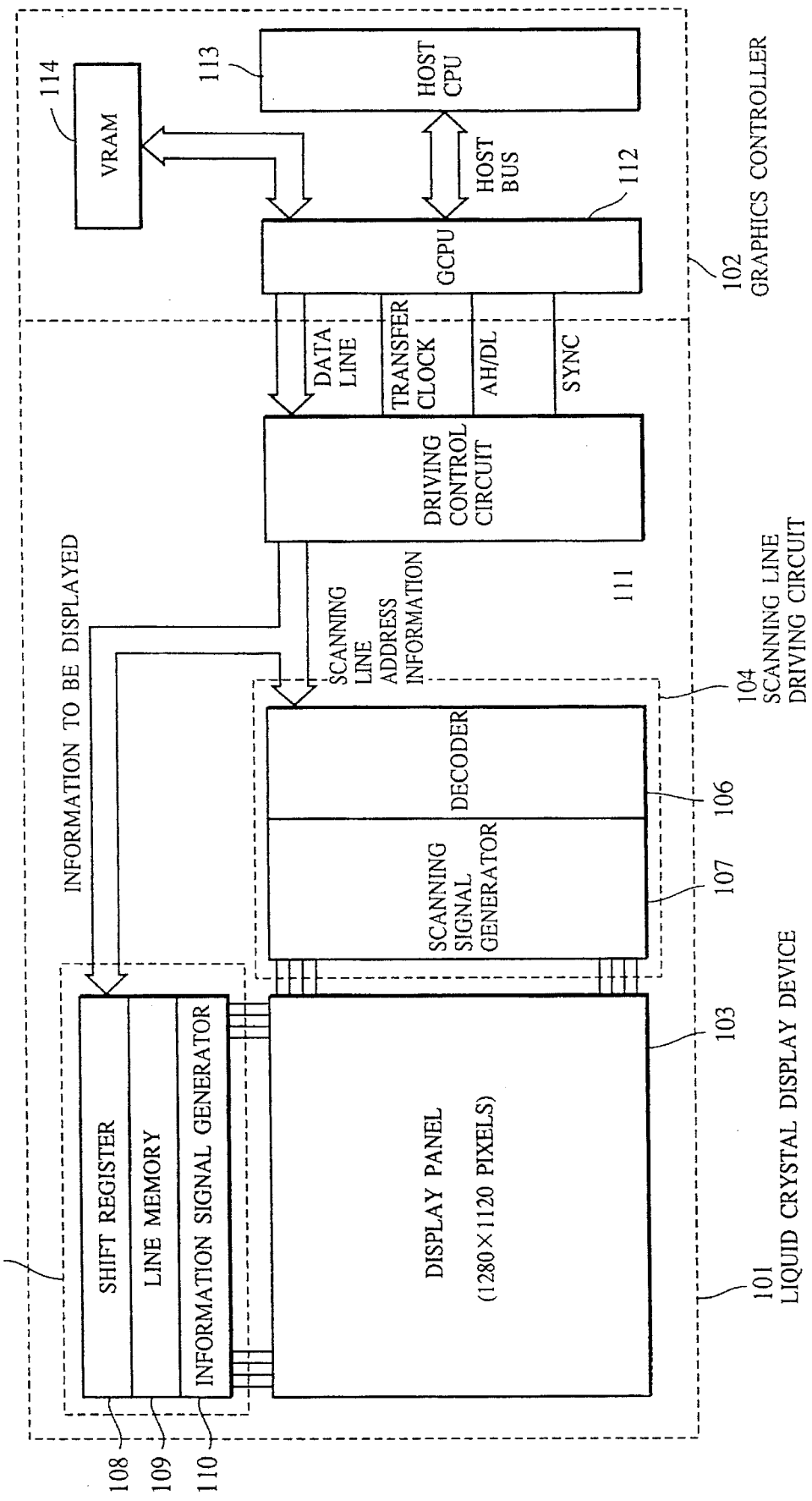
FIG. 5 is a block diagram of a graphics controller and a liquid crystal device according to the present invention.
Figure 6:
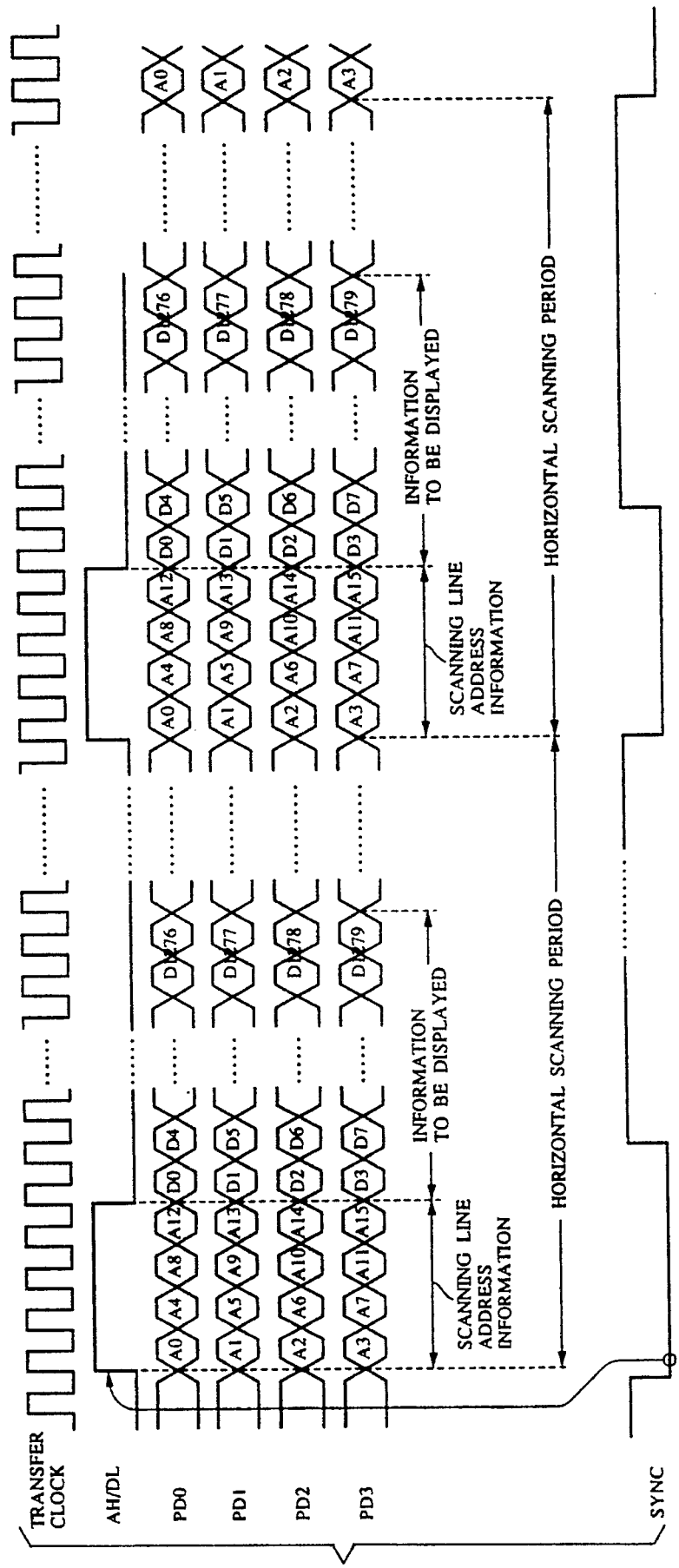
FIG. 6 is a timing chart illustrating image information communication between the graphics controller and the liquid crystal device according to FIG. 6.

When the ferroelectric liquid crystal device is used as a display panel 103, it is connected to a graphics controller 102 or the like as shown in FIG. 5. Image information is generated by the graphics controller 102 (typically installed in a main portion of the apparatus), and is transferred to the display panel 103 via signal transfer means shown in FIGS. 5 and 6. The graphics controller 102 comprises a CPU (central processing unit) 112 and a VRAM (memory for storing image information) 114, and is responsible for managing and communicating image information from a host CPU 113 to the liquid crystal display apparatus 101. The liquid crystal display apparatus 101 also includes a scanning line driving circuit 104, information line driving circuit 105, decoder 106, scanning signal generator 107, shift register 108, line memory 109, information signal generator 110, and driving control circuit 111.

A method of driving a ferroelectric liquid crystal device according to the present invention is described below.

In the case where a device having a ferroelectric liquid crystal layer disposed between a pair of substrates is used to form a simple-matrix display apparatus, the apparatus can be driven by any of known techniques such as those disclosed in Japanese Laid-Open Patents Nos. 59-193426, 59-193427, 60-156046, and 60-156047.

Figure 7B:
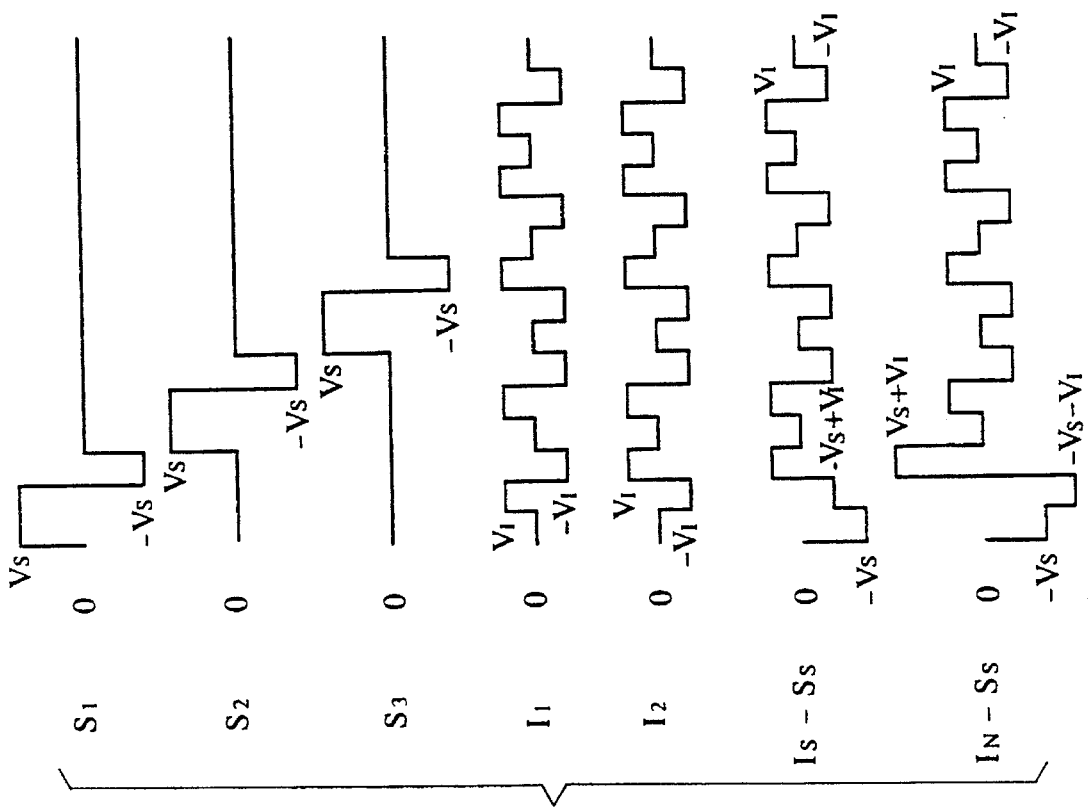
FIGS. 7(A) and 7(B) are waveforms for driving a liquid crystal device.
Figure 7A:
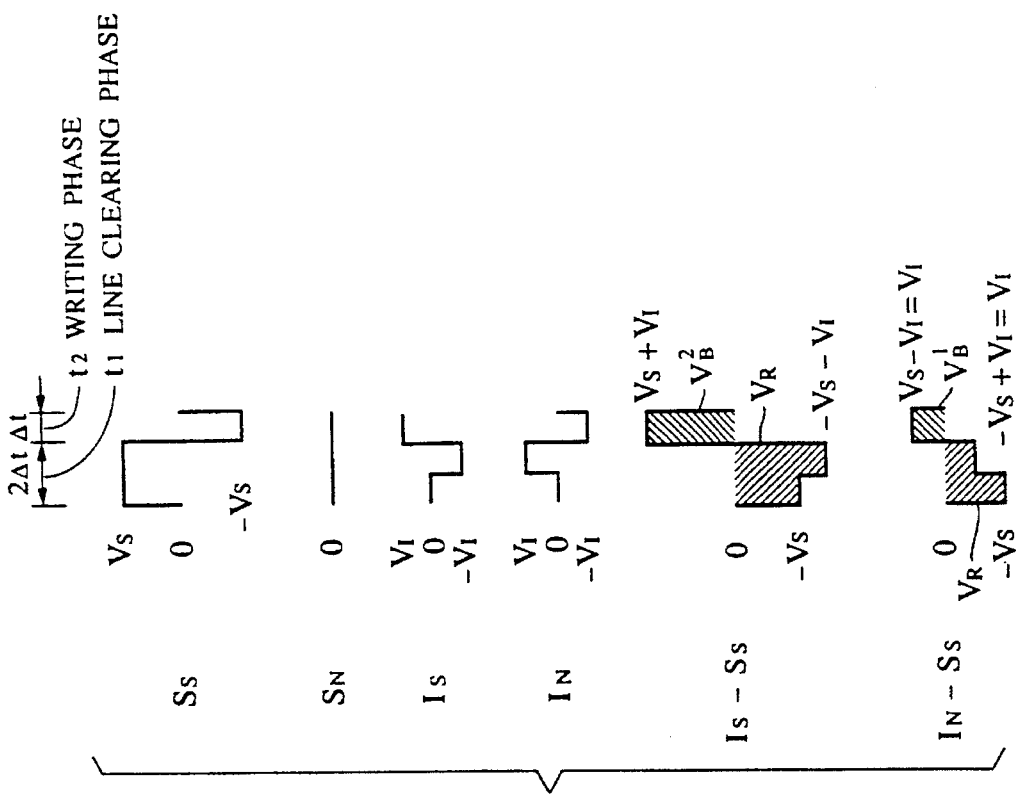
Figure 8:
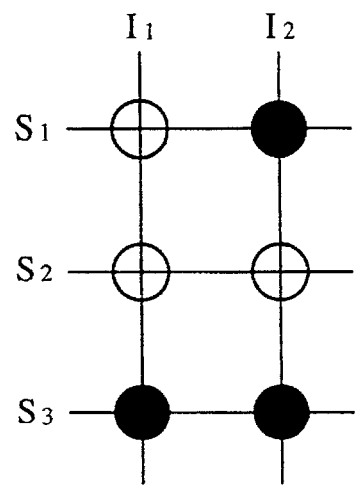
FIG. 8 is a display pattern obtained by driving a liquid crystal device with the driving waveform shown in FIG. 7(A)

FIGS. 7(A) and 7(B) illustrate an example of a driving waveform. In FIG. 7(A), $S_S$ denotes a selected-line scanning waveform applied to a selected scanning line. $S_N$ denotes a non-selected-line scanning waveform applied to a non-selected line, $I_S$ denotes a selected-line information waveform (black signal) applied to a selected data line, and $I_N$ denotes a non-selected-line information signal (white signal) applied to a non-selected data line. In FIG. 7(A), $I_S$–$S_S$ and $I_N$–$S_S$ denote voltage waveforms applied to pixels on a selected scanning line, wherein pixels to which voltage $I_S S_S$ is applied display black, and pixels to which voltage $I_N S_S$ is applied display white. FIG. 7(B) illustrates the relationships among these waveforms with respect to time for the case where an image shown in FIG. 8 is displayed.

In the driving example shown in FIG. 7(A), a minimum time period $\Delta t$ during which a single-polarity voltage is applied to pixels on a selected scanning line corresponds to a writing phase t2, and one line clearing phase t1 is set to a value equal to $2\Delta t$. Values of parameters $V_S$, $V_I$, and $\Delta t$ shown in the driving waveform of FIG. 7 are determined depending on switching characteristics of a liquid crystal material used.

Figure 10:
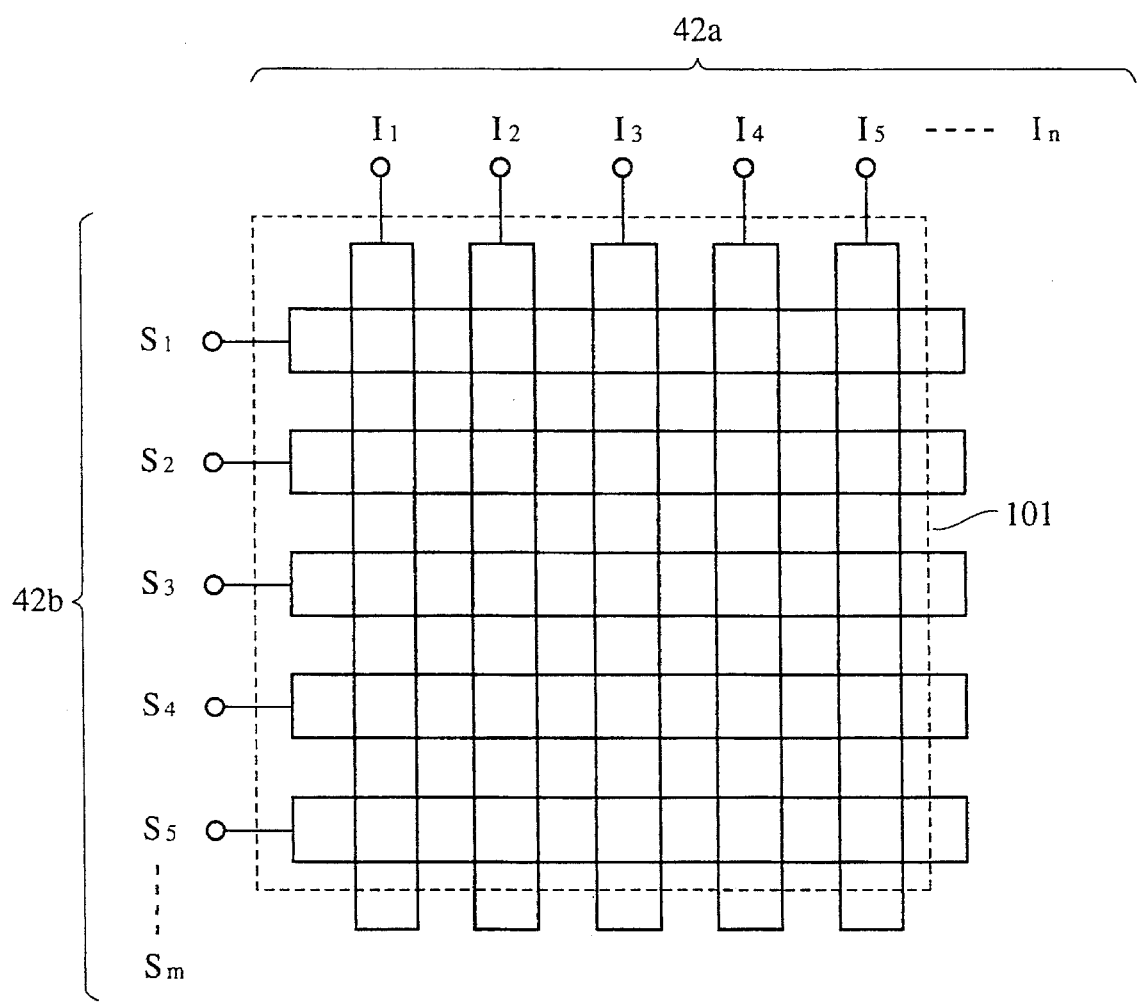
FIG. 10 is a plan view of liquid crystal panel electrodes arranged in a matrix form.

FIG. 10 illustrates a ferroelectric liquid crystal device used as a liquid crystal panel 101 to which the voltage waveform shown in FIG. 7 is applied. The liquid crystal panel 101 has information ("data") lines ($I_1, I_2, I_3 \ldots I_n$) in an scanning electrode set 42a and scanning lines ($S_1, S_2, S_3 \ldots S_n$) in an scanning electrode set 42b wherein the scanning and data lines cross each other and are arranged in a matrix form. A ferroelectric liquid crystal is disposed at each intersection point between each scanning line and data line.

Figure 9:
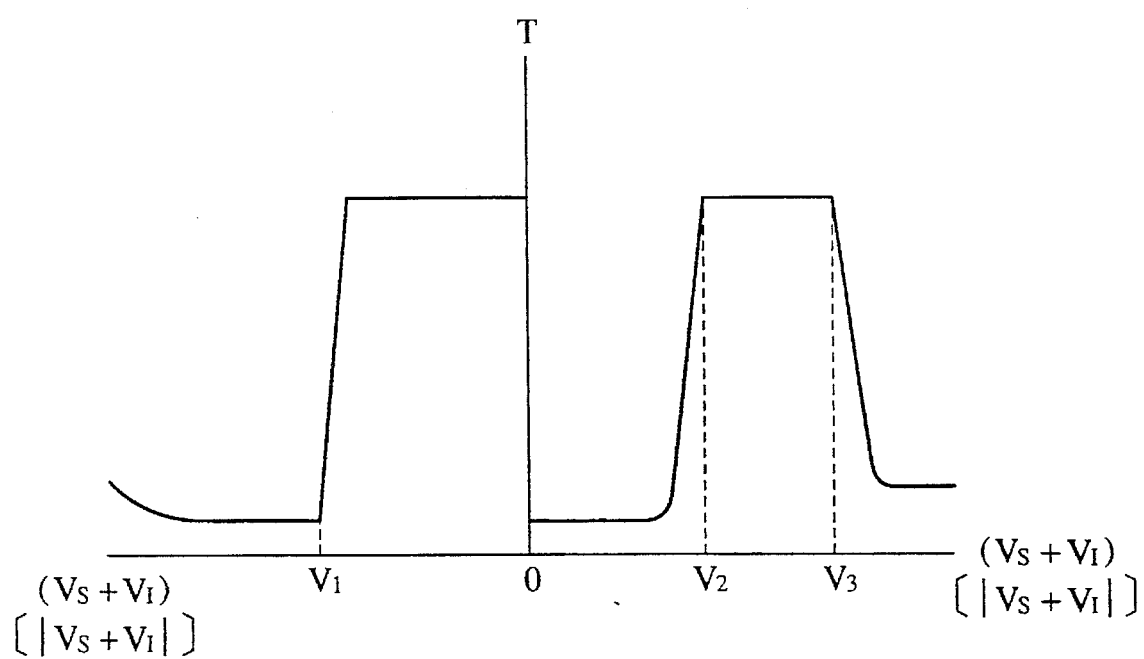
FIG. 9 is a V-T diagram illustrating the change in transmittance as a function of driving voltage.

FIG. 9 illustrates the V-T characteristic which represents the transmittance T as a function of the driving voltage ($V_S+V_I$) for a constant bias voltage ratio which will be described later. Here, $\Delta t$ and the bias ratio $V_I/(V_I+V_S)$ are fixed to 50 μsec and ⅓, respectively. In the positive region in FIG. 9, the waveform of $I_N$–$S_S$ shown in FIG. 7 is applied, and the waveform of $I_S$–$S_S$ is applied in the negative region.

In FIG. 9, $V_1$ and $V_3$ are referred to as an actual driving threshold voltage and crosstalk voltage, respectively. When $V_2 < V_1 < V_3$, $\Delta V = V_3 - V_1$ is referred to as a voltage margin which indicates a voltage swing which can be used in matrix driving. In general, $V_3$ exists in driving of an FLC display device. More specifically, $V_3$ is a voltage value of $V_B$ which induces switching in the waveform of $I_N$–$S_S$ shown in FIG. 7(A). Of course, it is possible to increase $V_3$ by increasing the bias ratio. However, the increase in the bias ratio results in an increase in the information signal, which brings about degradation picture quality such as an increase of flicker and a reduction in contrast. The inventors have determined that the bias ratio in the range of ⅓ to ¼ is preferable for practical use.

A liquid crystal display device can be obtained using a liquid crystal device according to the present invention as a display panel and by employing communication means with data formatting means including the graphics controller 102 of FIG. 5, and SYNC signal for synchronization.

Liquid crystal material for use in the liquid crystal device according to the present invention will be described below. As mentioned above, the liquid crystal material used in the present invention is one of factors which determine the construction and characteristics of the liquid crystal device of the present invention, and thus it is properly selected taking into account various factors such as the orientation films, their physical arrangement and their orientation treatment conditions.

In general, however, any mesomorphic compounds represented by general chemical formulas I–V shown below can be preferably used in the present invention. A ferroelectric liquid crystal compositions for use in the present invention comprise at least one mesomorphic compound (such as those described above in formulas I–V) as a main component and further comprise at least one kind of optically active compound as an essential component or other components selected so as to meet relationships (I)–(III). In this liquid crystal composition, the above liquid crystal compounds are, again, mixed at ratios properly determined according to meet the configuration or characteristics of the liquid crystal device.

Examples of mesomorphic compounds which can be preferably used in the present invention are as follows:

General Chemical Formula I

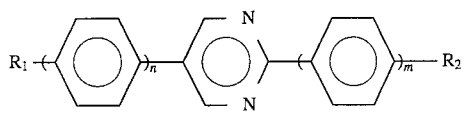

wherein n and m are 0, 1, or 2 and $0 < n+m \leq 2$; $R_1$ and $R_2$ are independently hydrogen atom, halogen, CN, or straight-chain, branched, or cyclic alkyl group containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_1$ and $R_2$ may be optically active.

General Chemical Formula II

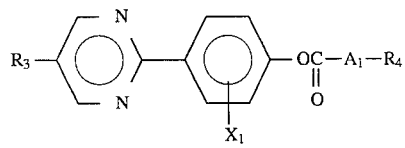

where $A_1$ denotes

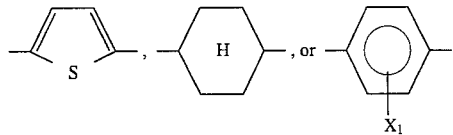

and $X_1$ is hydrogen or fluorine; $R_3$ and $R_4$ are independently hydrogen atom, halogen, CN, or straight-chain, branched, or cyclic alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_3$ and $R_4$ may be optically active.

General Chemical Formula III

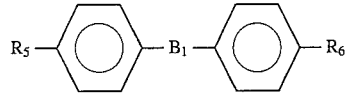

wherein $B_1$ denotes

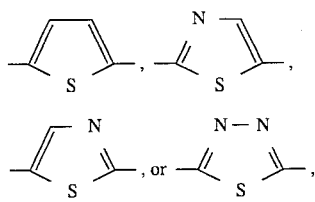

and $R_5$ and $R_6$ are independently hydrogen atom, halogen, CN, or straight-chain, branched, or cyclic alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_5$ and $R_6$ may be optically active.

General Chemical Formula IV

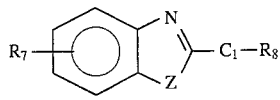

wherein $C_1$ denotes

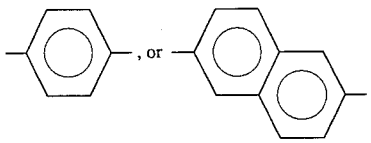

Z is —O—, or —S—;

General Chemical Formula V

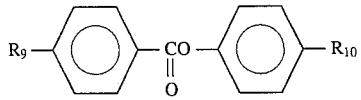

and $R_7$, $R_8$, $R_9$ and $R_{10}$ are independently hydrogen atom, halogen, CN, or straight-chain, branched, or cyclic alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_7$, $R_8$, $R_9$ and $R_{10}$ may be optically active.

Examples of more preferable compounds will be described below for each of the above general chemical formulas I through IV.

Examples of more preferable compounds included in the group represented by general chemical formula I include:

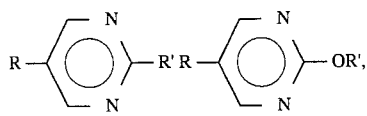

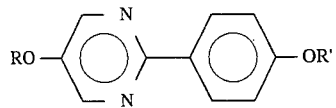

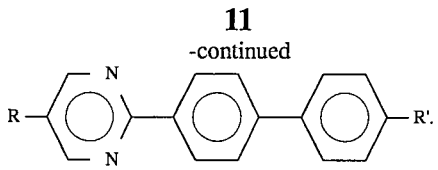

Examples of more preferable compounds included in the group represented by general chemical formula II include:

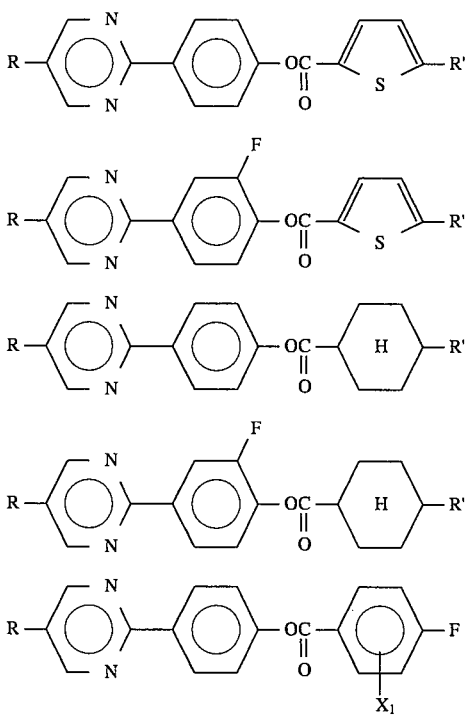

Examples of more preferable compounds included in the group represented by general chemical formula III include:

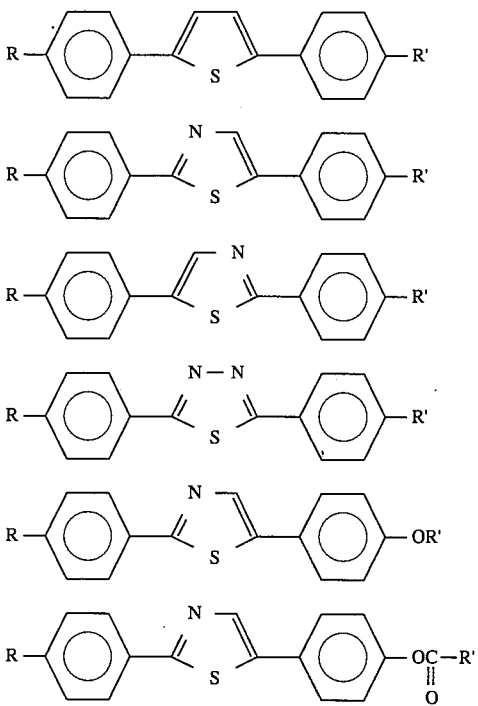

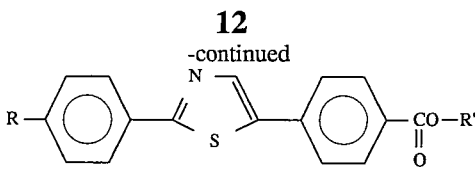

Examples of more preferable compounds included in the group represented by general chemical formula IV include:

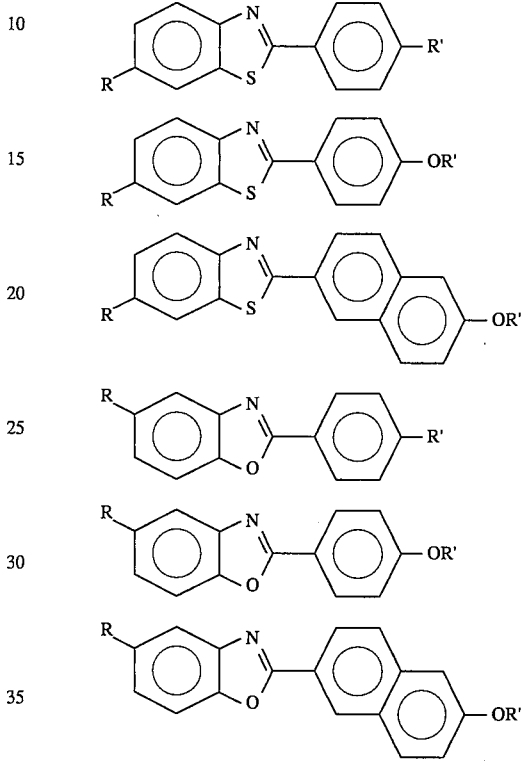

In the above examples of more preferable compounds, $X_1$ is the same as described previously R and R' are independently hydrogen atom, halogen, CN, or straight-chain, branched, or cyclic alkyl containing 1–18 carbon atoms, in which one of the alkyl radicals or two or more methylene radicals may be replaced with —O—, —S—, —CO—, —CHW—CH≡CH—, or —C≡C— (wherein W denotes halogen, CN, or $CF_3$) as long as hetero atoms are not located at adjacent locations; and R and R' may be optically active.

Referring to specific embodiments, the present invention will be described in more detail to facilitate an even clearer understanding. However, it should be understood that the present invention is not limited only to those embodiments.

FIG. 4 illustrates the device structure of an embodiment of a ferroelectric liquid crystal device according to the present invention. In this embodiment, the thickness of each substrate 44a and 44b was 1.1 mm, and the transparent electrodes 42a and 42b were made of an ITO film having a side metal (molybdenum). The term "side metal" is used to mean a type of low-resistance wiring, e.g., a layer of a metal provided on a side surface of an ITO electrode. Transparent dielectric films of tantalum oxide having a thickness of 1500 Å were deposited on the transparent electrodes 42a and 42b by using a sputtering technique. A polyimide film having a thickness of 300 Å was used as the orientation control films 43a and 43b. These films were formed by coating a solution of Hitachi-Kasei Ltd. LQ1802 (which is a precursor of polyimide) in N-methyl pyrrolidine and then baking at 270° C. Then, orientation control films 44a and 44b were subjected to rubbing treatment with acetate fiber cloth. As for spacers 46, silica micro beads having an average particle diameter of 1.2 μm were used. These beads were applied at a distribution density of 300/mm² using a Nordson electrostatic distribution technique. Adhesive epoxy-resin particles (Toray Industries, Inc. Toraypearl) having average particle diameter of 5.5 μm were also disposed between glass substrates 41a and 41b at a distribution density of 30/mm² using Nordson electrostatic distribution technique. Sealing was done by coating a liquid adhesive (Mitsui Toatsu Chemicals Inc. Structbond) having a thickness of 6 μm by using a printing technique. Then, two glass substrates 41a and 41b were placed one on another at a counter-clockwise crossing angle in the range of 4° to 12° in the same direction, and bonded by heating at 70° C. under the pressure of 2.8 kg/cm² for 5 min. The bonded cell was then further heated at 150° C. under the pressure of 0.63 kg/cm² for 4 hours so as to cure both kinds of adhesives (e.g., Toraypearl and Structbond) to produce a cured final product.

The inside of the cured cell was evacuated to about 10 Pa and a ferroelectric liquid crystal composition in an isotropic liquid crystal phase among the ferroelectric liquid crystal compositions A–N shown in Table 1 (which include at least one liquid crystal compound according to General Chemical Formulas (I)–(V) as a main component wherein these ferroelectric liquid crystal compositions) was injected into the cell. Then, the cell was cooled down to 30° C., during which the phase of the ferroelectric liquid crystal changed from a cholesteric phase via a smectic A phase to a chiral smectic C phase.

Table 1 shows the phase-transition temperature, magnitude of spontaneous polarization at 30° C. (Ps), cone angle (Θ), and layer tilt angle (δ) of each ferroelectric liquid crystal composition used in this embodiment. In Table 1, Cry denotes crystal phase or high-order smectic phase, SmC* chiral smectic C phase, SmA smectic A phase, Ch cholesteric phase, and Iso isotropic iquid phase.

The liquid crystal composition K is mixture of the following mesomorphic compounds with the ratios (wt %) described on the right side.

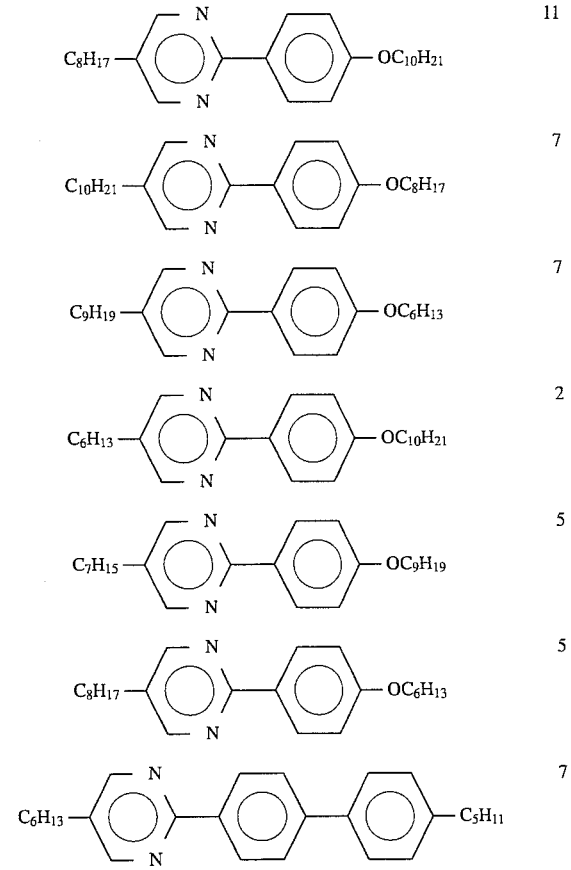

TABLE 1

| Liquid Crystal Composition | Phase-Transition Temperature (°C.) Cry ← SmC* ← SmA ← Ch ← Iso | | | | 30° C. Ps(nC/cm²) | Θ | δ |
|---|---|---|---|---|---|---|---|
| A | −22.3 | 67.0 | 90.5 | 99.2 | 6.3 | 15.0° | 10.2° |
| B | −13.2 | 55.4 | 78.7 | 85.1 | 3.8 | 13.7 | 9.6 |
| C | −23.3 | 69.7 | 92.8 | 100.0 | 6.1 | 14.4 | 9.5 |
| D | −19.7 | 66.3 | 89.1 | 95.6 | 6.1 | 14.5 | 10.0 |
| E | −22.0 | 67.1 | 89.0 | 94.9 | 6.5 | 14.9 | 10.2 |
| F | −21.0 | 67.6 | 89.0 | 94.7 | 6.5 | 15.0 | 9.8 |
| G | −26.3 | 69.4 | 90.2 | 98.2 | 8.3 | 15.6 | 10.7 |
| H | −17.9 | 68.8 | 92.0 | 100.0 | 7.2 | 14.8 | 10.2 |
| I | −26.9 | 72.9 | 93.4 | 104.0 | 6.3 | 15.5 | 11.0 |
| J | −13.5 | 66.4 | 87.5 | 94.5 | 6.4 | 14.8 | 10.2 |
| K | −14.9 | 69.1 | 88.1 | 95.0 | 6.1 | 15.3 | 10.2 |
| L | −15.2 | 68.8 | 89.6 | 96.0 | 6.0 | 15.0 | 10.1 |
| M | −13.8 | 68.3 | 90.4 | 98.4 | 6.5 | 15.2 | 10.4 |
| N | −14.2 | 69.0 | 93.9 | 100.6 | 6.0 | 14.7 | 10.0 |

Each liquid crystal composition A through J used here was obtained as a mixture of a few kinds of mesomorphic compounds such as those described above, other optically active compounds, and other materials with proper ratios so that there are differences in the phase-transition temperatures and magnitude of spontaneous polarization depending on the composition.

Specifically, the liquid crystal compositions A to J contains phenyl pyrimidine-based mesomorphic material as an essential component.

-continued

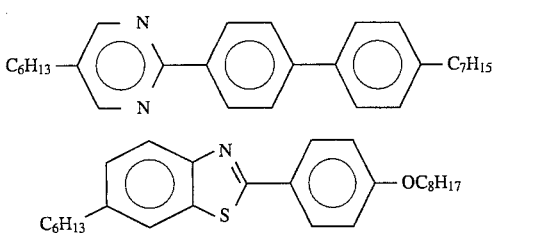

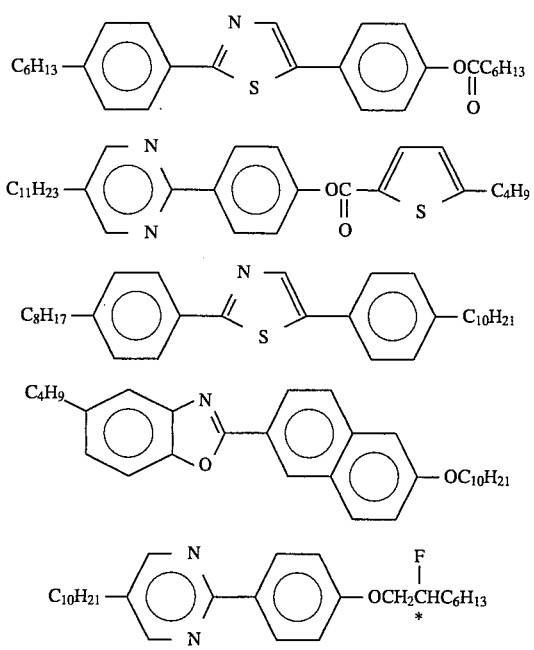
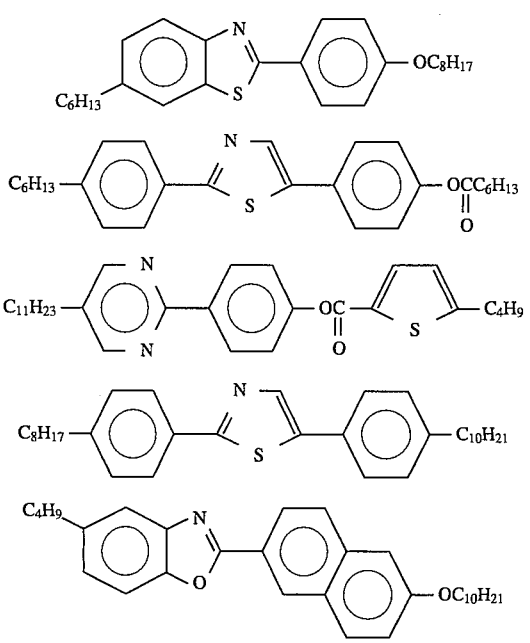
The liquid crystal composition L is mixture of the following mesomorphic compounds with the ratios (wt %) described on the right side.
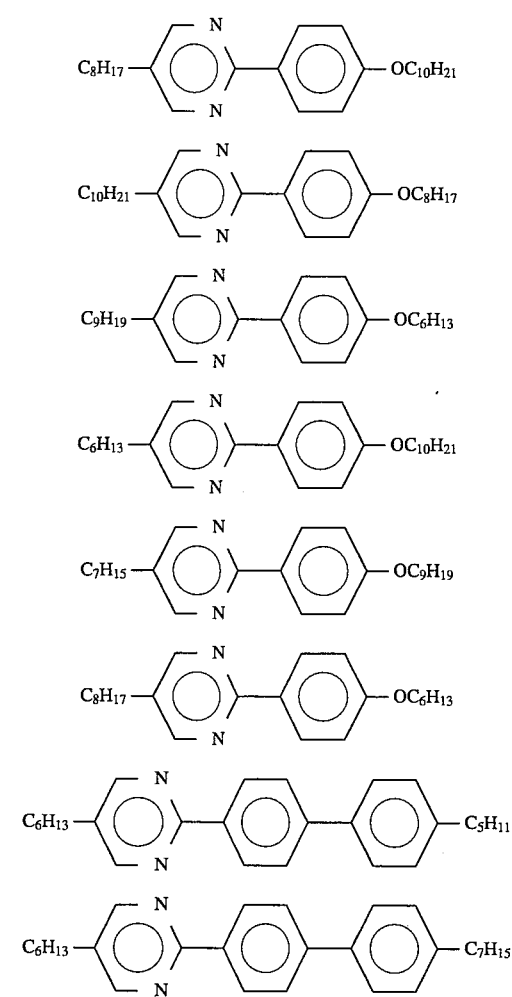
The liquid crystal composition M is a mixture of the following mesomorphic compounds with the ratios (wt %) described on the right side.
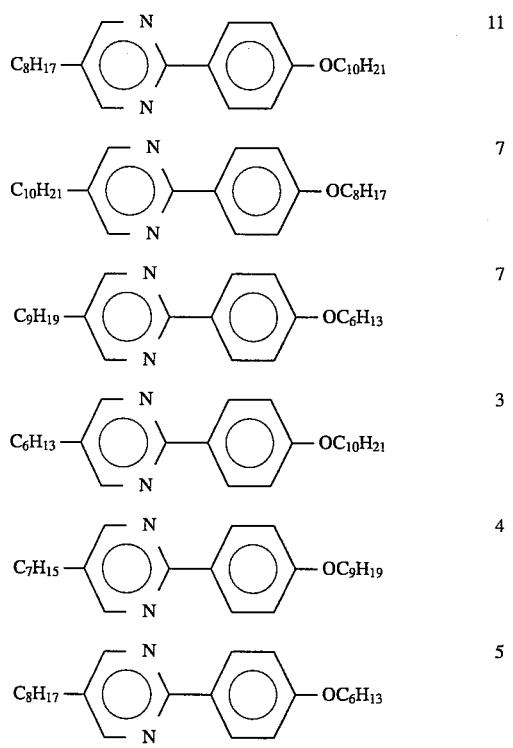

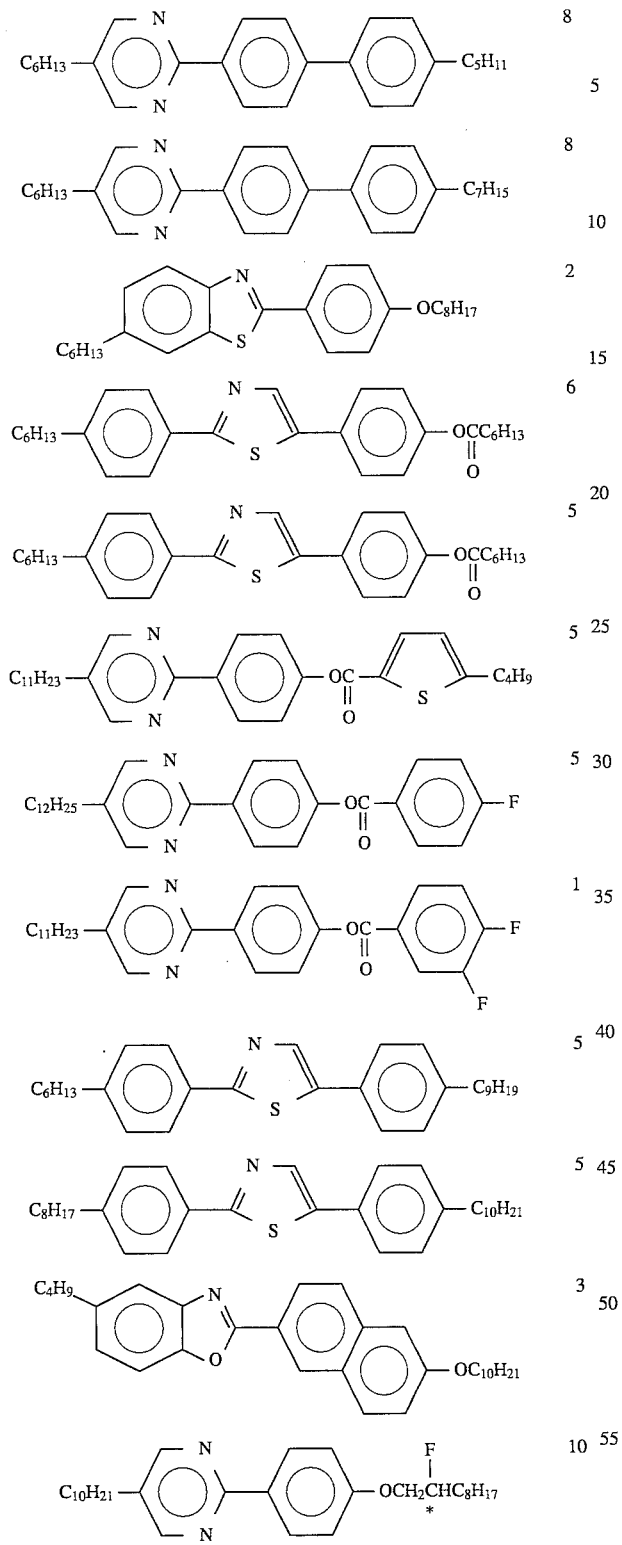
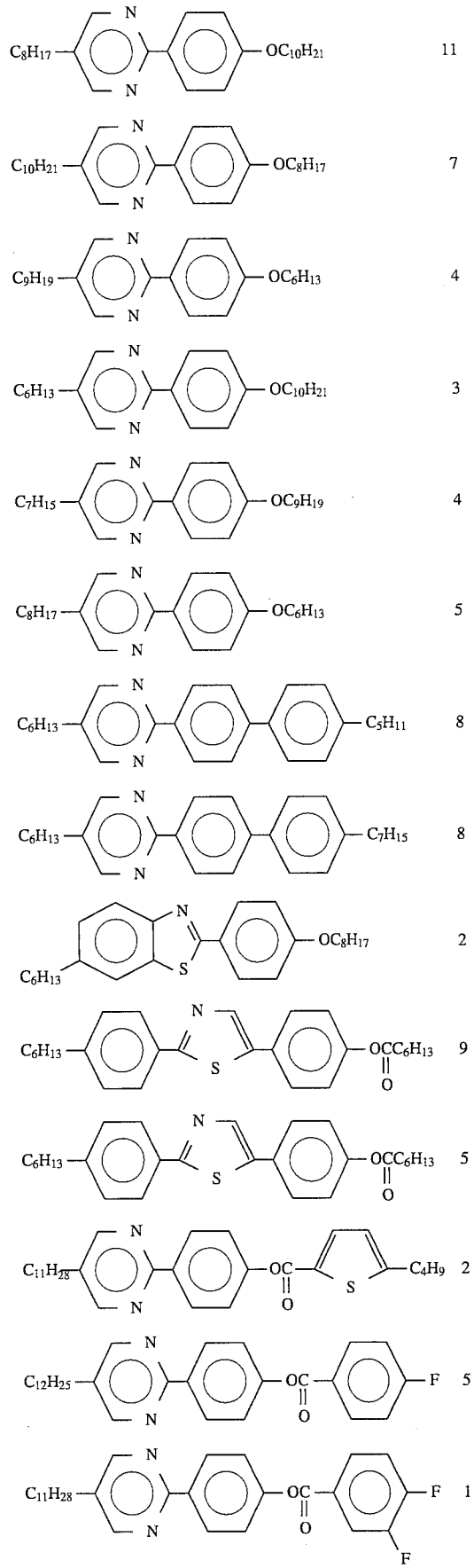
The liquid crystal composition N is a mixture of the following mesomorphic compounds with the ratios (wt %) described on the right side.

-continued

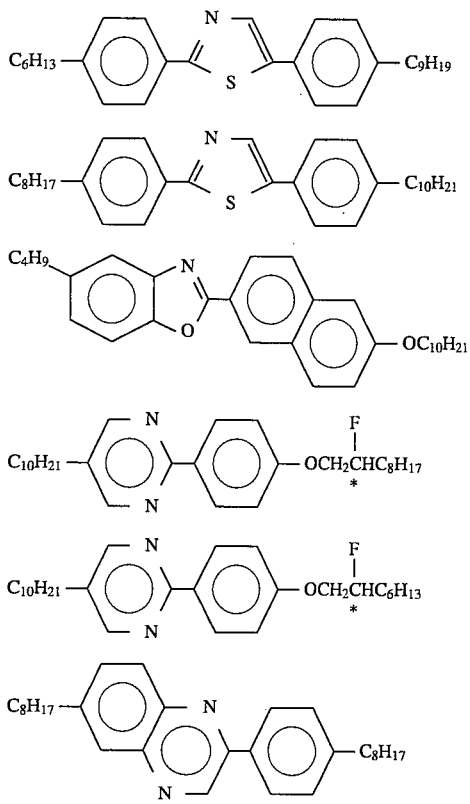

| | |
|---|---|
| $C_6H_{13}$—⟨ ⟩—C(N)=C(S)H—⟨ ⟩—$C_9H_{19}$ | 5 |
| $C_8H_{17}$—⟨ ⟩—C(N)=C(S)H—⟨ ⟩—$C_{10}H_{21}$ | 5 |
| $C_4H_9$—benzoxazole—naphthyl—$OC_{10}H_{21}$ | 3 |
| $C_{10}H_{21}$—pyrimidine—⟨ ⟩—$OCH_2CHC_8H_{17}$ (F, *) | 7 |
| $C_{10}H_{21}$—pyrimidine—⟨ ⟩—$OCH_2CHC_6H_{13}$ (F, *) | 3 |
| $C_8H_{17}$—quinoxaline—⟨ ⟩—$C_8H_{17}$ | 3 |

The liquid crystal compositions A through N have a temperature range in which cholesteric phase and smectic A phase exist at the same time.

Methods used here to measure the cone angle Θ, tilt angle $\theta_a$, layer tilt angle δ, and pretilt angle α of liquid crystal compounds will be described.

MEASUREMENT OF CONE ANGLE Θ

While applying an AC voltage having an amplitude of 30 to 50 V and a frequency of 1 to 100 Hz to a liquid crystal device disposed between upper and lower substrates via electrodes under the crossed-Nicol condition, the liquid crystal device was rotated in parallel to polarizing plates, and first and second extinction positions (at which the transmittance becomes minimum) were determined from the optical response detected by a Hamamatsu Photonics Ltd. photomultiplier. The cone angle θ is defined as a half of the angle between the first and second extinction positions.

MEASUREMENT OF TILT ANGLE $\theta_a$

After a single pulse having an amplitude equal to the threshold voltage of a liquid crystal was applied, a first extinction position was determined by rotating the liquid crystal in parallel to polarizing plates under no electric field and under the crossed-Nicol condition. Then, a single pulse having a polarity opposite to that of the above pulse was applied, and a second extinction position was determined under no electric field. The apparent tilt angle $\theta_a$ is defined as a half of the angle between the first and second extinction positions.

MEASUREMENT OF LAYER TILT ANGLE δ

The layer tilt angle δ was measured according to basically the same method as that developed by Clark and LaGerwall (Japan Display '86, Sep. 30 to Oct. 2, 1986, 456–458), or Ohuchi's method (J. J. A. P., 27(5), 1988, 725–728). Measurement was done using a rotating cathode X-ray diffraction apparatus (produced by MAC Science). A micro sheet (having a thickness of 80 μm) produced by Corning Glass Works was employed as a substrate material to reduce the absorption of the X-ray by the glass substrates.

MEASUREMENT OF PRETILT ANGLE α

The pretilt angle α was determined according to the crystal rotation method disclosed in Short Notes in J. J. A. P., Vol.19 (1980) No. 10, 2013. Substrates which had been subjected to axial orientation treatment such as rubbing were bonded in parallel in the opposite direction to form a cell having a thickness of 20 μm. A standard liquid crystal composition comprising 80 wt % Chisso Ltd. ferroelectric liquid crystal CS-1014, mixed with a 20 wt % compound represented by the following formula was injected into the above cell.

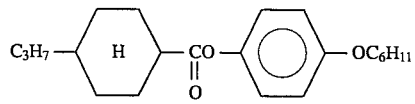

$$C_3H_7-\langle H \rangle-\underset{\underset{O}{\|}}{CO}-\langle \bigcirc \rangle-OC_6H_{11}$$

The liquid crystal composition exhibits SmA phase in the temperature range of 10° to 55° C.

The measurement was done as follows. While rotating the liquid crystal cell in the direction normal to the upper and lower substrates and in the plane containing the orientation process axis, the liquid crystal cell was illuminated with a helium-neon laser beam having a polarization plane with an angle of 45° relative to the rotation axis such that the laser beam was incident on the liquid crystal cell in the direction vertical to the rotation axis, and the intensity of the light transmitted through the cell and a polarizing plate having the transmission axis parallel to the incident polarization plane was detected by a photodiode disposed on the side opposite to the incident side. If the angle between a line normal to the liquid crystal cell and the center angle of a group of hyperbolic curves of transmitted light intensity produced by interference is denoted by φ, then the pretilt angle α can be obtained according to the following equation:

$$T(\phi) = \cos^2\left[\frac{\pi d}{\lambda}\left[N_o N_e \frac{\sqrt{N^2(\alpha)-\sin^2(\phi)}}{N^2(\alpha)} - \sqrt{N_o^2-\sin^2(\phi)} - \frac{N_o^2-N_e^2}{N^2(\alpha)}\sin(\alpha)\cos(\alpha)\sin(\phi)\right]\right]$$

wherein $N_0$ denotes the refractive index for ordinary ray, Ne denotes the refractive index for extraordinary ray, φ denotes the rotation angle of a liquid crystal panel, T(φ) denotes the intensity of the transmitted light, d denotes the thickness of the cell, and λ denotes the wavelength of the incident light, and wherein N(α) is defined as:

$$N(\alpha) \equiv \sqrt{N_o^2\cos^2(\alpha)+N_e^2\sin^2(\phi)}$$

The terms "ordinary ray" and "extraordinary ray" are authorized technical terms used in regard to birefringence. Birefringence is one of major characteristics exhibited by liquid crystal. The light which oscillates in the direction perpendicular to optical axis of the liquid crystal is referred to as "ordinary ray", while the light which oscillates in the direction parallel to the optical axis of the liquid crystal is referred to as "extraordinary ray".

Various liquid crystal devices having a device structure such as that described above were fabricated using ferroelectric liquid crystal compositions A through N described earlier, and characteristics of these devices were evaluated, together with devices prepared as comparative examples.

Table 2 shows the relationships among the temperature range $T_{ch-SmA}$ in which a mixture of cholesteric phase and smectic A phase can exist, the density of wavy line defects, and the contrast for each liquid crystal device. The measurement of contrast (C/R) of samples according to the present invention and comparative examples was carried out in such a manner that the amount of transmitted light was detected by a Hamamatsu Photonics Ltd. photomultiplier for a liquid crystal device placed at one extinction position (at which the transmittance becomes minimum) under no electric field and under the crossed-Nicol condition while maintaining the amount of light emitted by a light source constant. Displaying of the entire white and entire black was done using the waveform shown FIG. 3 having an amplitude of ±10.5 V (partially ±4.5 V) for the scanning side and ±4.5 V for the information side, which corresponds to Vop =15.0 V in FIG. 3. The ambient temperature was controlled using a temperature-controlled oven wherein the temperature at the surface of a panel was directly monitored using a thermocouple. $T_{ch-SmA}$ was measured by observing a sample placed on a hot stage or an ITO heater via a polarizing microscope, wherein the temperature at which simultaneous existence of both cholesteric phase and smectic A phase was observed was detected by a thermocouple directly attached to the surface of a cell.

In Table 2, "1H Period" denotes a writing time for one scanning line as shown in FIG. 3, wherein the value of 1H period was set to 1.2 times the minimum value required to display high-quality white or black in a measurement area. It is apparent that these liquid crystal devices satisfy the above-described conditions (I), (II), (III) regarding the liquid crystal orientation. When these liquid crystal devices are not driven, they all show high contrast greater than 80.

As can be seen, the liquid crystal devices of Embodiments 1–18 all maintain high contrast greater than 30 even when they are driven. Furthermore, it can be seen that liquid crystal devices Embodiments 3–17 have a value greater than 0.7° C. with respect to the temperature range $T_{ch-SmA}$ in which both cholesteric and smectic A phases can exist at the same time exhibit a very low density of wavy line defects, and that these liquid crystal devices exhibit very high contrast greater than 50 even when they are driven. In contrast, in the case of Reference Samples 1–11 having $T_{ch-SmA}$ of at most 0.2 exhibit a high density of wavy line defects. Furthermore, experiments have revealed that when these samples are driven, the dark level increases and thus the contrast decreases down to +or less.

Evaluation of movement in a liquid crystal device will be described

Using liquid crystal devices having the same structures as those of Embodiments 1, 4, 6, 7, 9, 13, 15, and 16 and Reference Samples 1, 2, 5, 7, 9, and 10, liquid crystal display

TABLE 2

| Comp. | | α | Crossing Angle | $T_{ch-SmA}$ | Density of Wavy Defects | C/R (30° C.) | H Period (μsec) | $\theta_a$ (30° C.) |
|---|---|---|---|---|---|---|---|---|
| Embod. 1 | A | 19° | 8° | 0.3° C. | fairly low | 36 | 178 | 12.0 |
| Embod. 2 | A | 18 | 6 | 0.4 | low | 46 | 183 | 11.6 |
| Embod. 3 | B | 19 | 8 | 1.2 | very low | 88 | 255 | 10.5 |
| Embod. 4 | C | 19 | 8 | 0.8 | low | 70 | 120 | 11.4 |
| Embod. 5 | C | 17 | 9 | 1.0 | low | 61 | 119 | 11.2 |
| Embod. 6 | D | 19 | 8 | 1.2 | very low | 77 | 111 | 11.5 |
| Embod. 7 | D | 22 | 12 | 1.0 | very low | 50 | 114 | 11.1 |
| Embod. 8 | D | 16 | 4 | 1.3 | extremely low | 70 | 115 | 11.5 |
| Embod. 9 | E | 19 | 8 | 1.6 | extremely low | 79 | 124 | 11.9 |
| Embod. 10 | E | 19 | 10 | 1.5 | very low | 73 | 127 | 11.7 |
| Embod. 11 | E | 20 | 8 | 1.7 | extremely low | 105 | 113 | 11.6 |
| Embod. 12 | F | 19 | 8 | 1.9 | extremely low | 91 | 110 | 12.1 |
| Embod. 13 | F | 17 | 6 | 1.9 | extremely low | 108 | 107 | 11.7 |
| Embod. 14 | L | 22 | 8 | 0.8 | very low | 62 | 142 | 11.2 |
| Embod. 15 | L | 19 | 6 | 0.9 | very low | 71 | 147 | 11.0 |
| Embod. 16 | N | 17 | 8 | 0.8 | low | 57 | 110 | 11.4 |
| Embod. 17 | N | 20 | 10 | 0.7 | low | 59 | 104 | 11.2 |
| Embod. 18 | K | 18 | 8 | 0.4 | fairly low | 40 | 165 | 11.0 |
| Ref. Samp. 1 | G | 19 | 8 | 0.1 | high | 20 | 122 | 12.3 |
| Ref. Samp. 2 | G | 17 | 6 | 0.2 | high | 23 | 128 | 12.1 |
| Ref. Samp. 3 | H | 19 | 8 | 0.2 | fairly low | 27 | 124 | 11.6 |
| Ref. Samp. 4 | H | 20 | 10 | 0.1 | high | 21 | 122 | 11.4 |
| Ref. Samp. 5 | I | 19 | 8 | 0.1 | very high | 8 | 199 | 12.7 |
| Ref. Samp. 6 | I | 16° | 6° | 0.1° C. | very high | 13 | 193 | 12.8 |
| Ref. Samp. 7 | J | 19 | 8 | 0.1 | very high | 18 | 132 | 11.4 |
| Ref. Samp. 8 | A | 22 | 12 | 0.2 | high | 23 | 159 | 11.2 |
| Ref. Samp. 9 | K | 22 | 8 | 0.2 | high | 26 | 158 | 11.2 |
| Ref. Samp. 10 | M | 17~ | 8 | 0.2 | high | 19 | 134 | 11.5 |
| Ref. Samp. 11 | M | 19 | 10 | 0.2 | high | 23 | 129 | 11.7 | devices having a screen area with a horizontal length(information line side) of about 280 mm and a vertical height (scanning line side) of about 220 mm with 1280×1024 pixels were fabricated as shown in FIG. 5. The center direction of rubbing was parallel to scanning stripe electrodes in the horizontal direction. These liquid crystal display devices were driven with a driving waveform such as that shown in FIG. 3 having an amplitude of ±13.9 V (partially ±6.1 V) for the scanning side and ±6.5 V for the information side, which corresponds to Vop =20.0 V in FIG. 3, thereby displaying a vertical stripe pattern in which white and black appear alternately every 100 lines at 30° C. for 100 hours. The ambient temperature was controlled using a temperature-controlled oven wherein the temperature at the surface of each panel was directly monitored using a thermocouple. The evaluation results are shown in Table 3.

a great reduction in contrast or due to local changes in cell gaps due to the movement of the liquid crystal is also suppressed.

CONCLUSIONS

Figure 11:
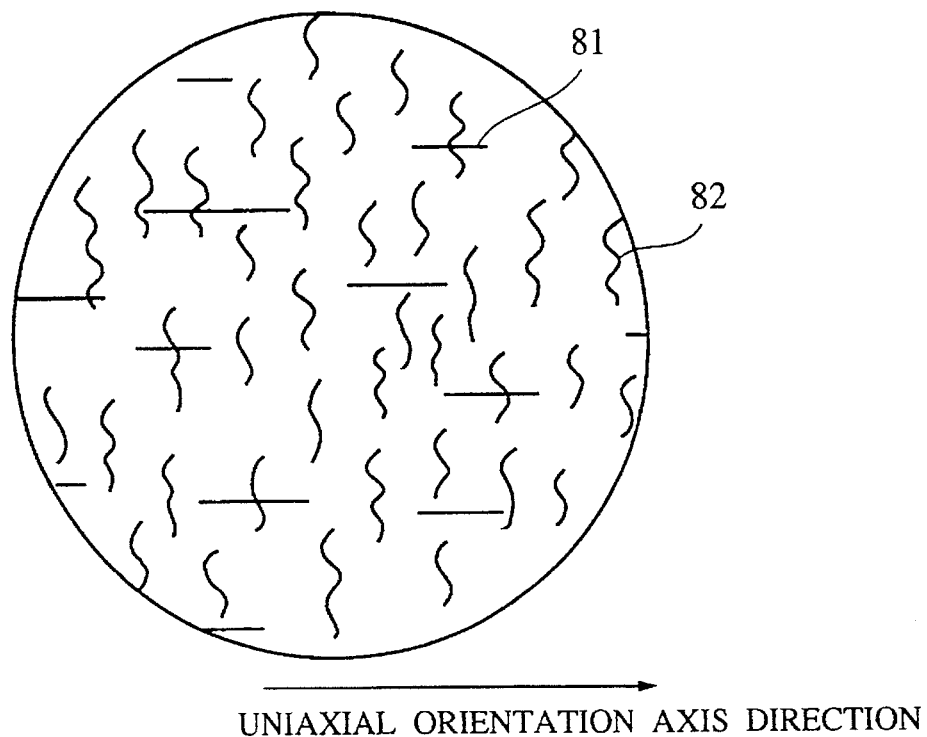
FIGS. 11 and 12 illustrate an orientation state having "straight line" and "wavy line" defects.
Figure 12:
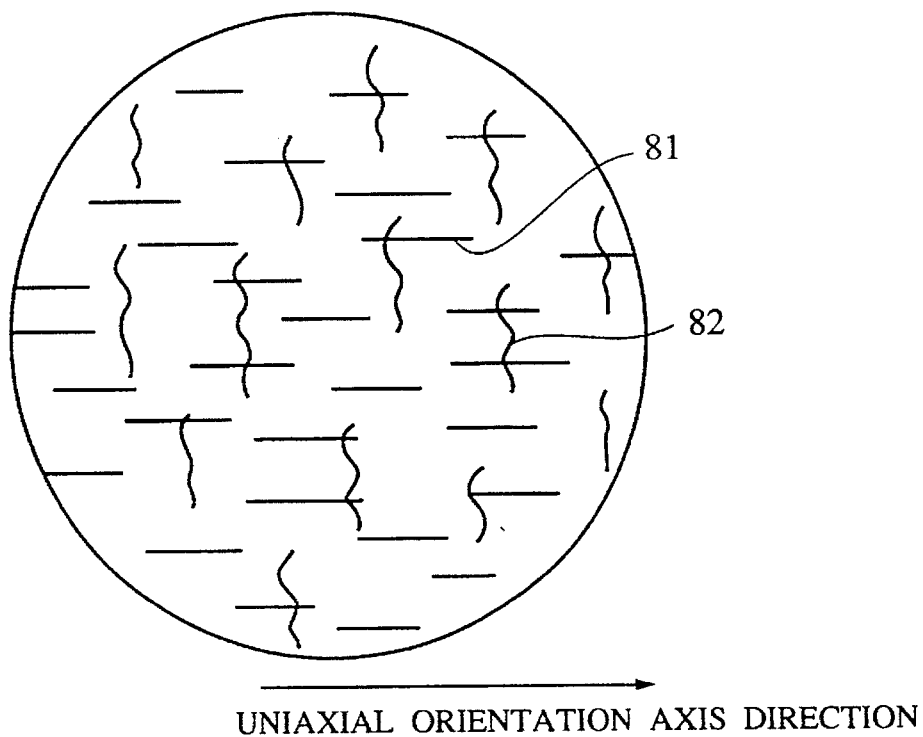

As seen, FIGS. 11 and 12 schematically illustrate uniform monodomain orientation states in which "straight line" defects 81 appearing in the direction parallel to the uniaxial orientation axis and "wavy line" defects 82 appearing in directions different from the uniaxial orientation axis can be observed. It can be understood that the orientation axes of straight line defects 81 deviate slightly from those of monodomains surrounding the defects. It can also be understood that wavy line defects 82 are generated by discontinuity between the inner portion of a smectic layer formed between substrates and portions near the substrates.

TABLE 3

| Compsit. | | α | Crossing Angle | $T_{ch\text{-}SmA}$ | Density of Wavy Defects | Movement of Liquid Crystal (after 100 hr at 30° C.) | H Period (μsec) |
|---|---|---|---|---|---|---|---|
| Embod. 19 | A | 19° | 8° | 0.3° C. | fairly low | +0.04 μm | 122 |
| Embod. 20 | C | 19 | 8 | 0.3 | low | +0.02 μm | 83 |
| Embod. 21 | D | 19 | 8 | 1.2 | very low | none | 77 |
| Embod. 22 | D | 22 | 12 | 1.0 | very low | none | 80 |
| Embod. 23 | E | 19 | 8 | 1.6 | extremely low | none | 88 |
| Embod. 24 | F | 17 | 6 | 1.9 | extremely low | none | 77 |
| Embod. 25 | L | 19 | 6 | 0.9 | very low | none | 101 |
| Embod. 26 | N | 17 | 8 | 0.8 | low | +0.03 μm | 77 |
| Ref. Samp. 12 | G | 19 | 8 | 0.1 | high | +0.43 μm | 86 |
| Ref. Samp. 13 | G | 17 | 6 | 0.2 | high | +0.35 μm | 90 |
| Ref. Samp. 14 | I | 19 | 8 | 0.1 | very high | +0.27 μm | 135 |
| Ref. Samp. 15 | J | 19 | 8 | 0.1 | very high | +0.22 μm | 93 |
| Ref. Samp. 16 | K | 22 | 8 | 0.2 | high | +0.19 μm | 108 |
| Ref. Samp. 17 | M | 17 | 8 | 0.2 | high | +0.33 μm | 93 |

In Table 3, "1H Period" denotes a writing time for one scanning line as shown in FIG. 3, wherein the value of H period was set to 1.1 times the minimum value required to display a high-quality white and black pattern in the entire panel area. The movement of liquid crystal is defined as the maximum change (increase) in cell gap in the entire panel area (detected by a change in color).

From Table 3, it can be seen that liquid crystal devices of Embodiments 19–26 show almost no local changes in cell gap due to the movement of a liquid crystal and no degradation in display quality. In contrast, Reference Samples 12–17 exhibit relatively small $T_{ch\text{-}SmA}$ and relatively high density of wavy line defects. Moreover, fluctuations of liquid crystal molecules often occur due to the above-described non-selected signal waveform, which causes a reduction in contrast and local variations in cell gaps due to the movement of a liquid crystal, and thus results in degradation in display quality.

From the above results, it is apparent that liquid crystal devices having a preferable value greater than 0.3° with respect to the temperature range $T_{ch\text{-}SmA}$ in which both cholesteric and smectic A phases can exist at the same time exhibit a very low density of wavy line defects, and that in these liquid crystal devices, fluctuations of liquid crystal molecules due to the non-selected signal waveform during the driving operation are suppressed. Furthermore, in these liquid crystal devices, degradation in display quality due to The present inventors have also determined that when a liquid crystal in isotropic phase is cooled from a high temperature to chiral smectic C phase via cholesteric and smectic A phases, straight line defects 81 appear at approximately the same time that the smectic A phase appears, and the defect density is maintained constant even after the liquid crystal has changed to chiral smectic C phase. On the other hand, while wavy line defects 82 also appear at approximately the same time that the smectic A phase appears, wavy line defects become more clear and the defect density changes when the liquid crystal has changed to chiral smectic C phase as the layer tilt angle δ increases.

From the above, it is possible to reach the following conclusions.

(1) By properly controlling the temperature range $T_{ch\text{-}SmA}$ in which both cholesteric and smectic A phases exist at the same time during the cooling process of a liquid crystal in isotropic phase, it is possible to control the orientation state such as the ratio of the density of straight line defects 81 appearing in the direction parallel to the uniaxial orientation axis and the density of wavy line defects 82 appearing in directions deviated from the uniaxial orientation axis.

(2) In liquid crystal devices in an orientation state with a high density of wavy line defects 82, strong fluctuations of liquid crystal molecules occur when the non-selected signal is applied. This causes a reduction in dynamic contrast to a level much lower than the static contrast. Furthermore, movement of the liquid crystal is induced and thus the device is destroyed.

(3) The modes of wavy line defects 82 and straight line defects 81 are opposite to each other. By controlling the orientation state such as the defect density ratio, it is possible to reduce the fluctuations of liquid crystal molecules when the non-selected pulse signal is applied, thereby preventing a great reduction of dynamic contrast and also preventing the devices from being destroyed.

In liquid crystal devices having a temperature range $T_{ch\text{-}SmA}$ in which both cholesteric and smectic A phases exist at the same time, straight line defects 81 become dominant and the density of wavy line defects 82 decreases.

As discussed above in connection with the results of embodiments, it is preferable that the temperature range $T_{ch\text{-}SmA}$ in which both cholesteric and smectic A phases exist at the same time be greater than 0.3° to achieve desirable characteristics in the present invention, and it is more preferable that it be greater than 0.7°.

Furthermore, experiments have revealed that the temperature range $T_{ch\text{-}SmA}$ in which both cholesteric and smectic A phases exist at the same time depends on liquid crystal compounds comprising a liquid crystal composition such as the type of the skeleton structures, the selection of lengths of side-chains, and mixing ratios of these compounds. The main factor which determines the $T_{ch\text{-}SmA}$ is the characteristic of the liquid crystal composition. For example, by comparing Embodiment 14 and Reference Sample 9, it is understood that the only difference is that between the liquid crystal compositions L and K. Similarly, by comparing Embodiment 16 and Reference Sample 10, as well as Embodiment 26 and Reference Sample 17, it is also seen that the only difference is that between the liquid crystal compositions M and N. As described above, $T_{ch\text{-}SmA}$ can be increased by properly selecting the types of liquid crystal compositions and by adjusting the mixing ratios of these liquid crystal compositions. Thus, a desirable value of $T_{ch\text{-}SmA}$ can be obtained by performing fine adjustment of the mixing ratio between compounds which lead to stable ch phase and compounds which cause instability and that between compounds which lead to stable SmA phase and compounds which cause instability. Even in the case where the same type of liquid crystal composition is used, the difference in the device structure can produce a slight difference in $T_{ch\text{-}SmA}$, controllability of wavy line defects, and contrast, as can be seen by comparing Embodiment 1 and Reference Sample 8 (or Embodiment 18 and Reference Sample 9). In general, $T_{ch\text{-}SmA}$ can also be increased by controlling the pretilt angle α at a value less than 20° (for example by slightly increasing the intensity of rubbing for an orientation control film thereby slightly increasing the constraining force to molecule orientation).

In the present invention, as described above, a liquid crystal device is produced with a liquid crystal having a temperature range $T_{ch\text{-}SmA}$ in which both cholesteric and smectic A phases exist at the same time during the process of cooling the liquid crystal in isotropic liquid phase, wherein the liquid crystal is formed from a liquid crystal composition including a plurality of compounds and the crossing angle of the orientation treatment direction is adjusted so that the liquid crystal device satisfis the conditions represented by equations (I), (II), and (III) thereby controlling the orientation state such as the ratio of the density of straight line defects 81 appearing in the direction parallel to the uniaxial orientation axis to the density of wavy line defects 82 appearing to directions deviated from the uniaxial orientation axis, especially controlling the density of wavy line defects 82, whereby the fluctuations of liquid crystal molecules due to non-selected pulses are reduced and thus a great reduction in dynamic contrast and destruction of the device due to movement of the liquid crystal are prevented.

What is claimed is:

1. A ferroelectric liquid crystal device comprising:

a pair of substrates comprising electrodes for applying a voltage, said pair of substrates having been subjected to a uniaxial orientation treatment, and being oriented at a distance opposite to each other such that the uniaxial orientation axes cross each other at a predetermined angle; said display device further comprising a liquid crystal material disposed between said pair of substrates exhibiting at least two stable states, said liquid crystal material having a cone angle, a pretilt angle, a tilt angle and an apparent tilt angle, wherein:

said liquid crystal material having an orientation state which satisfies the conditions represented by $$\Theta<\alpha+\delta, \delta<\alpha, \text{ and } \Theta>\Theta_\alpha>\Theta/2$$

in which $\Theta$ denotes said cone angle, $\alpha$ denotes said pretilt angle, $\delta$ denotes said tilt angle and $\Theta_\alpha$ denotes said apparent tilt angle wherein the phase of said liquid crystal changes from isotropic phase via cholesteric phase and smectic A phase to chiral smectic C phase as said liquid crystal cools from said isotropic phase and said liquid crystal has a temperature range in which said cholesteric phase and said smectic A phase exist at the same time.

2. A ferroelectric liquid crystal device according to claim 1, wherein said temperature range in which the cholesteric phase and the smectic A phase exist at the same time is at least 0.3° C.

3. A ferroelectric liquid crystal device according to claim 1, wherein said temperature range in which the cholesteric phase and the smectic A phase exist at the same time is at least 0.7° C.

4. A ferroelectric liquid crystal device according to claim 1, wherein the crossing angle of the uniaxial orientation axes of said pair of substrates is in the range from 0° to 25°.

5. A ferroelectric liquid crystal device according to claim 1, wherein the pretilt angle α of the chiral smectic liquid crystal is at least 20°.

6. A ferroelectric liquid crystal device according to claim 1, wherein the liquid crystal is a liquid crystal composition containing at least one compound selected from the group consisting of compounds represented by the following general chemical formulas I through V:

General Chemical Formula I:

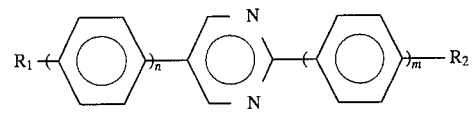

wherein n and m are 0, 1, or 2 and $0<n+m\leq 2$; $R_1$ and $R_2$ are independently hydrogen atom, halogen, CN, or straight-chain, or branched alkyl groups containing 1–18 carbon atoms, in which one of the alkyl groups or two or more methylene groups may be replaced with —O—, —S—, 13 CO—, —CHW— CH=CH—, or —C≡C— (wherein W denotes halogen, CN, or CF$_3$) as long as hetero atoms are not located at adjacent locations; and $R_1$ and $R_2$ may be optically active;

General Chemical Formula II:

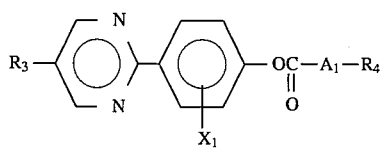

where $A_1$ denotes

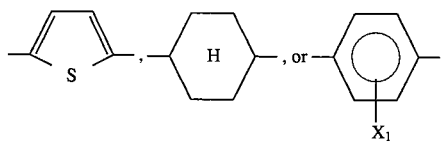

and $X_1$ is hydrogen or fluorine; $R_3$ and $R_4$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_3$ and $R_4$ may be optically active;

General Chemical Formula III:

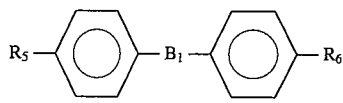

wherein $B_1$ denotes

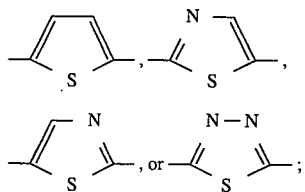

and $R_5$ and $R_6$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_5$ and $R_6$ may be optically active;

General Chemical Formula IV:

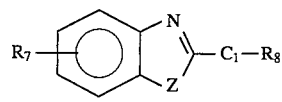

wherein $C_1$ denotes

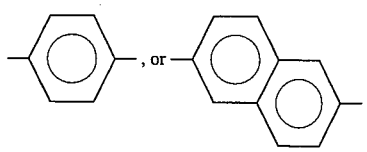

Z is —O—, or —S—; and

General Chemical Formula V:

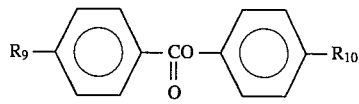

and $R_7$, $R_8$, $R_9$ and $R_{10}$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_7$, $R_8$, $R_9$ and $R_{10}$ may be optically active.

7. A liquid crystal apparatus having a ferroelectric liquid crystal device, said liquid crystal device comprising:

a pair of substrates comprising electrodes for applying a voltage, said pair of substrates having been subjected to a uniaxial orientation treatment, and being oriented at a distance opposite to each other such that the uniaxial orientation axes cross each other at a predetermined angle; said display device further comprising a liquid crystal material disposed between said pair of substrates exhibiting at least two stable states, said liquid crystal material having a cone angle, a pretilt angle, a tilt angle and an apparent tilt angle, wherein:

said liquid crystal material having an orientation state which satisfies the conditions represented by $$\Theta < \alpha + \delta, \delta < \alpha, \text{ and } \Theta > \Theta_\alpha > \Theta/2$$

in which $\Theta$ denotes said cone angle, $\alpha$ denotes said pretilt angle, $\delta$ denotes said tilt angle and $\Theta_\alpha$ denotes said apparent tilt angle wherein the phase of said liquid crystal changes from isotropic phase via cholesteric phase and smectic A phase to chiral smectic C phase as said liquid crystal cools from said isotropic phase and said liquid crystal has a temperature range in which said cholesteric phase and said smectic A phase exist at the same time.

8. A liquid crystal apparatus according to claim 7, further comprising:

a driving unit for driving a ferroelectric liquid crystal device; and a light source for illuminating the ferroelectric liquid crystal device.

9. A liquid crystal apparatus according to claim 7, wherein said temperature range in which the cholesteric phase and the smectic A phase exist at the same time is at least 0.3° C.

10. A liquid crystal apparatus according to claim 8, wherein said temperature range in which the cholesteric phase and the smectic A phase exist at the same time is at least 0.3° C.

11. A liquid crystal apparatus according to claim 7, wherein said temperature range in which the cholesteric phase and the smectic A phase exist at the same time is at least 0.7° C.

12. A liquid crystal apparatus according to claim 8, wherein said temperature range in which the cholesteric phase and the smectic A phase exist at the same time is at least 0.7° C.

13. A liquid crystal apparatus according to claim 7, wherein the pretilt angle α of the chiral smectic liquid crystal is at least 20° C.

14. A liquid crystal apparatus according to claim 8, wherein the pretilt angle α of the chiral smectic liquid crystal is at least 20° C.

15. A liquid crystal apparatus according to claim 7, wherein the crossing angle of the uniaxial orientation axes of said pair of substrates is in the range from 0° to 25°.

16. A liquid crystal apparatus according to claim 8, wherein the crossing angle of the uniaxial orientation axes of said pair of substrates is in the range from 0° to 25°.

17. A liquid crystal apparatus according to claim 7, wherein said liquid crystal is a liquid crystal composition containing at least one compound selected from the group consisting of compounds represented by the following general chemical formulas I through V:

General Chemical Formula I:

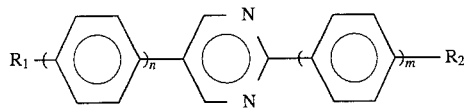

wherein n and m are 0, 1, or 2 and 0<n+m≦2; $R_1$ and $R_2$ are independently hydrogen atom, halogen, CN, or straight-chain, or branched alkyl group containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_1$ and $R_2$ may be optically active;

General Chemical Formula II

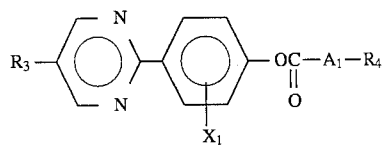

where $A_1$ denotes

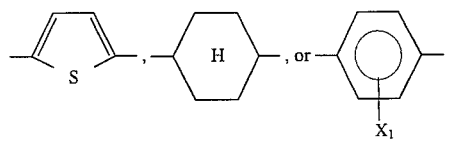

and $X_1$ is hydrogen or fluorine; $R_3$ and $R_4$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_3$ and $R_4$ may be optically active;

General Chemical Formula III

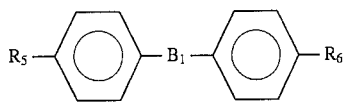

wherein $B_1$ denotes

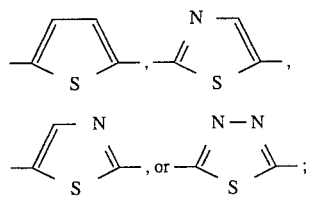

and $R_5$ and $R_6$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_5$ and $R_6$ may be optically active;

General Chemical Formula IV

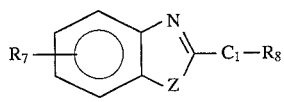

wherein $C_1$ denotes

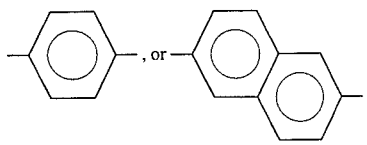

Z is —O—, or —S—; and

General Chemical Formula V

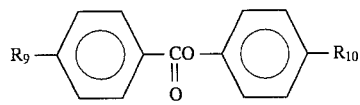

and $R_7$, $R_8$, $R_9$ and $R_{10}$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_7$, $R_8$, $R_9$ and $R_{10}$ may be optically active.

18. A liquid crystal apparatus according to claim 8, wherein said liquid crystal is a liquid crystal composition containing at least one compound selected from the group consisting of compounds represented by the following general chemical formulas I through V:

General Chemical Formula I

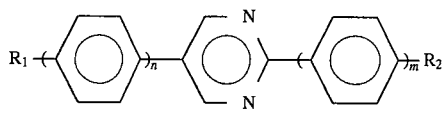

wherein n and m are 0, 1, or 2 and 0<n+m≦2; $R_1$ and $R_2$ are independently hydrogen atom, halogen, CN, or straight-chain, or branched alkyl group containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_1$ and $R_2$ may be optically active;

General Chemical Formula II

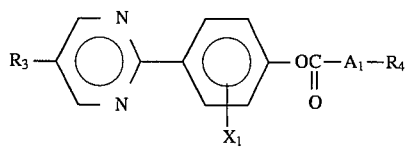

where $A_1$ denotes

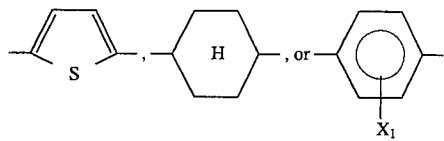

and $X_1$ is hydrogen or fluorine; $R_3$ and $R_4$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_3$ and $R_4$ may be optically active;

General Chemical Formula III

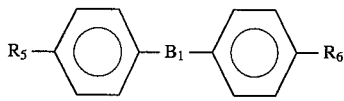

wherein $B_1$ denotes

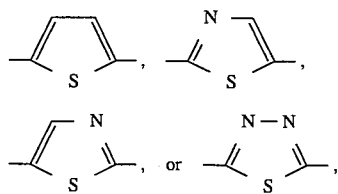

and $R_5$ and $R_6$ are independently hydrogen atom, halogen, CN, or straight-chain, or branched alkyl containing 1–18 carbon atoms, in which one of the alkyl radicals or two or more methylene radicals may be replaced with —O—, —S—, —CO—, —CHW—CH=CH—, or —C≡C— (wherein W denotes halogen, CN, or $CF_3$) as long as hetero atoms are not located at adjacent locations; and $R_5$ and $R_6$ may be optically active;

General Chemical Formula IV

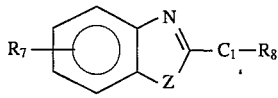

wherein $C_1$ denotes

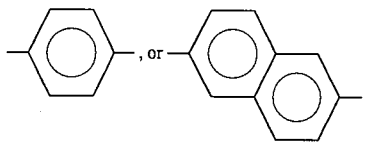

Z is —O—, or —S—; and

General Chemical Formula V

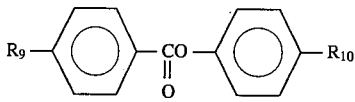

and $R_7$, $R_8$, $R_9$ and $R_{10}$ are independently hydrogen atom, halogen, CN, or straight-chain, or branched alkyl containing 1–18 carbon atoms, in which one of the alkyl radicals or two or more methylene radicals may he replaced with —O—, —S—, —CO—, —CHW—CH=CH—, or —C≡C— (wherein W denotes halogen, CN, or $CF_3$) as long as hereto atoms are not located at adjacent locations; and $R_7$, $R_8$, $R_9$ and $R_{10}$ may be optically active.

* * * * *

UNITED STATES PATENT AND TRADEMARK OFFICE
CERTIFICATE OF CORRECTION

PATENT NO.    : 5,573,703

DATED         : November 12, 1996

INVENTOR(S)   : MASAHIRO TERADA ET AL.

It is certified that error appears in the above-identified patent and that said Letters Patent is hereby corrected as shown below:

On the title page:
REFERENCES CITED, [56]

Insert (under FOREIGN PATENT DOCUMENTS):
      --548548 6/1993 European Patent Office
        571955 12/1993 European Patent Office--.

FOREIGN PATENT DOCUMENTS
      Line 6, "01140198" should read --01-140198--.
      Line 7, "03252624" should read --03-252624--.

ABSTRACT, [57]

Line 8, "the exhibiting" should read --the pair of
      substrates exhibiting--.

COLUMN 1

Line 31, "10" should be deleted.
   Line 59, "rubbing-treated tilt" should read --rubbing
      treated polyimide film as an orientation control
      layer, the apparent tilt--.
   Line 60, "polymide film as an orientation control layer,
      the apparent" should be deleted.

COLUMN 2

Line 14, "10" should be deleted.
   Line 54, "simple" should read --simply--.

UNITED STATES PATENT AND TRADEMARK OFFICE
CERTIFICATE OF CORRECTION

PATENT NO.  : 5,573,703

DATED  : November 12, 1996

INVENTOR(S) : MASAHIRO TERADA ET AL.

It is certified that error appears in the above-identified patent and that said Letters Patent is hereby corrected as shown below:

COLUMN 3

Line 33, "writing. Taking" should read --writing.
¶ Taking--.
Line 36, "display" should read --display and--.
Line 59, "0f" should read --Of--.

COLUMN 4

Line 1, "stable," should read --stable state,--.
Line 32, "said" should read --said pair of substrates--.
Line 33, "states and pair of substrates," should read
--states,--.
Line 43, "θ denotes" should read --δ denotes-- and
"$\alpha_\alpha$ denotes" should read --$\theta_\alpha$ denotes--.
Line 44, "angle." should read --angle,--.

COLUMN 6

Line 29, "the" should be deleted.
Line 65, "etc. Polarizing" should read --etc.
¶ Polarizing--.

COLUMN 7

Line 25, "least two stable states, wherein the
apparent tilt angle $\theta_a$" should be deleted.
Line 27, "at (ii)" should read --at least two
stable states, wherein the apparent tilt
angle $\theta_a$ (ii)--.

UNITED STATES PATENT AND TRADEMARK OFFICE
CERTIFICATE OF CORRECTION

PATENT NO. : 5,573,703

DATED : November 12, 1996

INVENTOR(S) : MASAHIRO TERADA ET AL.

It is certified that error appears in the above-identified patent and that said Letters Patent is hereby corrected as shown below:

COLUMN 8

Line 19, "At" should read --$\Delta t$--
Line 30, "an scanning" should read --a data--.
Line 31, "an" should read --a--.
Line 64, "of" should read --of the--.

COLUMN 9

Line 5, "A ferroelectric" should read --Ferroelectric--.

COLUMN 10

Line 34, "-S-;" should read -- -S-; and --.

COLUMN 12

Line 40, "previously" should read --previously,--.

COLUMN 13

Line 6, "having" should read --having an--.
Line 9, "using" should read --using a--.
Line 25, "component" should read --component)--.
Line 26, "compositions) was" should read --compositions were"--.
Line 36, "iquid" should read --liquid--.
Line 65, "tains" should read --tain--.

UNITED STATES PATENT AND TRADEMARK OFFICE
CERTIFICATE OF CORRECTION

PATENT NO. : 5,573,703
DATED : November 12, 1996
INVENTOR(S) : MASAHIRO TERADA ET AL.

It is certified that error appears in the above-identified patent and that said Letters Patent is hereby corrected as shown below:

COLUMN 14

Line 1, "is" should read --is a--.

COLUMN 15

Line 26, "is" should read --is a--.

COLUMN 19

Line 62, "$\delta$was" should read --$\delta$ was--.
   Line 63, "LaGerwall" should read --Lagerwall--.
   Line 65, "Ohuchi's" should read --Ouchi's--.

COLUMN 20

Line 36, "a" should read --$\alpha$--.
   Line 61, "to" should read --to the--.

COLUMN 21

Line 16, "shown" should read --shown in--.
   Table 2, "H Period" should read 1 H Period--.

COLUMN 22

Line 12, "have" should read --having--.
   Line 19, "0.2" should read --0.2°C--.
   Line 23, "+or" should read --30 or--.

UNITED STATES PATENT AND TRADEMARK OFFICE
CERTIFICATE OF CORRECTION

PATENT NO.   : 5,573,703
DATED        : November 12, 1996
INVENTOR(S)  : MASAHIRO TERADA ET AL.

It is certified that error appears in the above-identified patent and that said Letters Patent is hereby corrected as shown below:

COLUMN 23

```
Table 3, "H period" should read --1 H period--.
Line 1, "length(infor-" should read --length
    (infor- --.
Line 60, "0.3°" should read --0.3°C--.
```

COLUMN 25

```
Line 17, "0.3°" should read --0.3°C--.
Line 19, "0.7°" should read --0.7°C--.
Line 61, "satisfis" should read --satisfies--.
Line 66, "to" should read --in--.
```

COLUMN 26

```
Line 24, "angle" should read --angle,--.
Line 63, "13CO-," should read -- -CO-, --.
```

COLUMN 28

```
Line 44, "angle" should read --angle,--.
```

COLUMN 29

```
Line 41, "Formula II" should read --Formula II:--.
```

UNITED STATES PATENT AND TRADEMARK OFFICE
CERTIFICATE OF CORRECTION

PATENT NO. : 5,573,703

DATED : November 12, 1996

INVENTOR(S) : MASAHIRO TERADA ET AL.

It is certified that error appears in the above-identified patent and that said Letters Patent is hereby corrected as shown below:

COLUMN 30

Line 1, "Formula III" should read --Formula III:--.
    Line 28, "Formula IV" should read --Formula IV:--.
    Line 45, "Formula V" should read --Formula V:--.

COLUMN 31

Line 1, "Formula I" should read --Formula I:--.
    Line 19, "Formula II" should read --Formula II:--.
    Line 46, "Formula III" should read --Formula III:--.

UNITED STATES PATENT AND TRADEMARK OFFICE
CERTIFICATE OF CORRECTION

PATENT NO. : 5,573,703

DATED : November 12, 1996

INVENTOR(S) : MASAHIRO TERADA ET AL.

It is certified that error appears in the above-identified patent and that said Letters Patent is hereby corrected as shown below:

<u>COLUMN 32</u>

```
Line 20, "Formula IV" should read --Formula IV:--.
Line 35, "Formula V" should read --Formula V:--.
Line 47, "hereto" should read --hetero--.
```

Signed and Sealed this

Twentieth Day of May, 1997

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO.   : 5,573,703

DATED        : November 12, 1996

INVENTOR(S)  : MASAHIRO TERADA ET AL.

It is certified that error appears in the above-identified patent and that said Letters Patent is hereby corrected as shown below:

<u>COLUMN 26</u>

Line 15, "strates exhibiting" should read --strates and exhibiting--.

<u>COLUMN 28</u>

Line 35, "strates exhibiting" should read --strates and exhibiting--.

Signed and Sealed this

Ninth Day of December, 1997

Attest:

BRUCE LEHMAN

*Attesting Officer*   *Commissioner of Patents and Trademarks*